United States Patent
Notestein et al.

(10) Patent No.: US 9,815,044 B2
(45) Date of Patent: Nov. 14, 2017

(54) CERIA-SUPPORTED METAL CATALYSTS FOR THE SELECTIVE REDUCTION OF $NO_X$

(71) Applicants: Toyota Motor Engineering & Manufacturing North America, Inc., Erlanger, KY (US); Northwestern University, Evanston, IL (US)

(72) Inventors: Justin M. Notestein, Evanston, IL (US); Dario Prieto-Centurion, Minneapolis, MN (US); Paul T. Fanson, Brighton, MI (US); Charles Alexander Roberts, Ann Arbor, MI (US)

(73) Assignees: Toyota Motor Engineering & Manufacturing North America, Inc., Erlanger, KY (US); Northwestern University, Evanston, IL (US)

( * ) Notice: Subject to any disclaimer, the term of this patent is extended or adjusted under 35 U.S.C. 154(b) by 0 days.

(21) Appl. No.: 15/010,391

(22) Filed: Jan. 29, 2016

(65) Prior Publication Data
US 2016/0236182 A1    Aug. 18, 2016

Related U.S. Application Data

(62) Division of application No. 14/084,436, filed on Nov. 19, 2013, now Pat. No. 9,283,548.

(51) Int. Cl.
*B01J 37/02*      (2006.01)
*B01J 23/02*      (2006.01)
(Continued)

(52) U.S. Cl.
CPC .......... *B01J 23/83* (2013.01); *B01D 53/9413* (2013.01); *B01J 23/10* (2013.01); *B01J 23/70* (2013.01);
(Continued)

(58) Field of Classification Search
CPC   B01J 37/0201; B01J 37/0203; B01J 37/0205; B01J 37/0219; B01J 37/024;
(Continued)

(56) References Cited

U.S. PATENT DOCUMENTS 4,714,694 A * 12/1987 Wan ..................... B01D 53/945
                                                                             502/304
6,245,307 B1    6/2001   Inui et al.
(Continued)

FOREIGN PATENT DOCUMENTS

CN         101130166 A     2/2008
WO     2010/071641 A1    6/2010
(Continued)

OTHER PUBLICATIONS

Chen et al., "The Synergetic Mechanism Between Copper Species and Ceria in NO Abatement Over Cu/CeO2 Catalysts" Applied Catalysis A; General, 377 (2010) pp. 121-127.
(Continued)

*Primary Examiner* — Cam N. Nguyen
(74) *Attorney, Agent, or Firm* — Christopher G. Darrow; Darrow Mustafa PC

(57) ABSTRACT

A composition and method for producing the same are provided. The composition includes transition metal oxides adhered to a surface of a cerium oxide support, and can additionally include alkali metal or alkaline earth metal promotors. The method includes incipient wetness impregnation of the support with metal salt in solution, and can include impregnation with a metal chelator salt. The composition can be useful as a catalyst for the reduction of noxious gases in combustion exhaust streams. The composition can be of particular use as a component of an automobile catalytic converter, for the specific catalytic reduction of nitrogen oxides to nitrogen gas.

18 Claims, 16 Drawing Sheets

(51) Int. Cl.
    B01J 23/04    (2006.01)
    B01J 23/10    (2006.01)
    B01J 23/70    (2006.01)
    B01J 23/78    (2006.01)
    B01J 23/83    (2006.01)
    B01D 53/94    (2006.01)
    B01J 35/10    (2006.01)

(52) U.S. Cl.
    CPC .......... B01J 23/78 (2013.01); B01J 35/1019 (2013.01); B01J 37/0201 (2013.01); B01J 37/0203 (2013.01); B01J 37/024 (2013.01); B01J 37/0205 (2013.01); B01J 37/0219 (2013.01); B01D 53/945 (2013.01); B01D 2251/202 (2013.01); B01D 2255/202 (2013.01); B01D 2255/2022 (2013.01); B01D 2255/2025 (2013.01); B01D 2255/2027 (2013.01); B01D 2255/2065 (2013.01); B01D 2255/20715 (2013.01); B01D 2255/20738 (2013.01); B01D 2255/20746 (2013.01); B01D 2255/20761 (2013.01); B01D 2255/705 (2013.01); Y02T 10/22 (2013.01)

(58) Field of Classification Search
    CPC ... B01J 23/02; B01J 23/04; B01J 23/10; B01J 23/70; B01J 23/78; B01J 23/83
    See application file for complete search history.

(56) References Cited

U.S. PATENT DOCUMENTS

| | | | |
|---|---|---|---|
| 7,105,137 B2 | 9/2006 | Efstathiou et al. | |
| 7,304,012 B2 | 12/2007 | Green et al. | |
| 7,396,795 B2 | 7/2008 | Reyes et al. | |
| 7,473,667 B2 | 1/2009 | Hagemeyer et al. | |
| 7,605,108 B2 | 10/2009 | Wakamatsu et al. | |
| 8,003,565 B2 | 8/2011 | Hagemeyer et al. | |
| 8,353,155 B2 | 1/2013 | Lewis et al. | |
| 8,435,918 B2 | 5/2013 | Eyring et al. | |
| 8,658,554 B2 | 2/2014 | Dorner et al. | |
| 8,716,170 B2 * | 5/2014 | Wolan .................... B01J 23/462 |
| | | | 502/260 |
| 8,906,820 B2 | 12/2014 | Fedeyko et al. | |
| 9,040,451 B2 | 5/2015 | Heidemann et al. | |
| 2004/0258593 A1 | 12/2004 | Koo et al. | |
| 2005/0176990 A1 | 8/2005 | Coleman et al. | |
| 2008/0112870 A1 | 5/2008 | Moini et al. | |
| 2009/0075813 A1 | 3/2009 | Whisenhunt, Jr. et al. | |
| 2009/0298673 A1 | 12/2009 | Akamine et al. | |
| 2009/0324468 A1 | 12/2009 | Golden et al. | |
| 2009/0324469 A1 | 12/2009 | Golden et al. | |
| 2009/0325793 A1 | 12/2009 | Takeshima et al. | |
| 2010/0152077 A1 | 6/2010 | Allston et al. | |
| 2010/0178224 A1 | 7/2010 | Koo et al. | |
| 2011/0301024 A1 | 12/2011 | Terorde et al. | |
| 2012/0124899 A1 | 5/2012 | DiFrancesco et al. | |
| 2013/0029839 A1 | 1/2013 | Borbujo et al. | |
| 2013/0109600 A1 | 5/2013 | Reed et al. | |

FOREIGN PATENT DOCUMENTS

| | | |
|---|---|---|
| WO | 2013/044115 A1 | 3/2013 |
| WO | 2013/082560 A1 | 6/2013 |

OTHER PUBLICATIONS

He et al., "Porous Cu/Ce—K—O Nanocomposite for Simultaneous Reomval of Soot and NOx from Diesel Exhaust Emission", J. Nanosci. Nanotech., 13, (2013) pp. 2696-2702.

* cited by examiner

| Precursor | Surface Species | Reduction Activity |
|---|---|---|
| >1.0 Fe nm$^{-2}$ NaFeEDTA / <1.0 Fe nm$^{-2}$ NaFeEDTA / <1.0 Fe nm$^{-2}$ Fe(NO$_3$)$_3$ | Isolated ions, Small Clusters | Low |
| | 2-Dimensional Sheets | High |
| | 3-Dimensional Crystallites | Low (Lacks Redox Cycling Capability) |

FIG. 1

CERIA-SUPPORTED METAL CATALYSTS FOR THE SELECTIVE REDUCTION OF $NO_X$

CROSS-REFERENCE TO RELATED APPLICATIONS

This application is a divisional application of U.S. patent application Ser. No. 14/084,436, filed on Nov. 19, 2013, now U.S. Pat. No. 9,283,548, issued on Mar. 15, 2016, the contents of which are incorporated by reference herein.

TECHNICAL FIELD

The present invention relates in general to a composition of matter including a support of cerium oxide modified with catalytic cations and optionally with promoter cations, to a method for fabricating the same, and in particular to the use of such a composition in the specific catalytic reduction of nitrogen oxides in automobile catalytic converter.

BACKGROUND

Automotive catalytic converter technology has evolved in part with the replacement of two-way catalytic converter technology by three-way catalytic converter technology. A three-way catalytic converter receives its name from the fact that it is simultaneously capable of catalyzing three chemical reactions involved in the oxidoreductive removal of pollutants from a combustion exhaust stream. These three reactions, in general form, are: i) oxidation of unburned hydrocarbons to carbon dioxide, ii) oxidation of incompletely burned carbon monoxide to carbon dioxide, and iii) reduction of oxides of nitrogen (principally $NO_2$ and NO) to nitrogen gas ($N_2$).

Three-way catalysts currently employ a support structure such as cerium dioxide that is capable of storing oxygen for use when oxygen effluent in the exhaust stream is low. The cerium dioxide support can be doped with compounds such as oxides of aluminum or zirconium to improve thermal stability, surface area, and oxygen storage capacity. Catalytic centers which can be composed of noble metal cations (platinum, palladium, or rhodium) are incorporated into the support structure and can be direct mediators of emission gas oxidation/reduction.

While current catalysts exhibit promising features in terms of capacity, efficiency, and thermal stability, there is a constant need to find further improvements in order to meet ever more demanding regulatory requirements.

SUMMARY

A catalyst and a method for fabricating the catalyst are disclosed herein. The catalyst discussed may have utility in treatment of automotive emissions, or components of combustion emission.

In one aspect, a method for fabricating a catalyst is provided. The method comprises contacting a substrate containing ceria with a solution containing catalytic cations; and contacting the substrate with a solution containing promoter cations; wherein the catalytic cations consist of transition metal cations, post-transition metal cations, or a combination thereof, and the promoter cations consist of alkali or alkaline earth metal cations or a combination thereof. In some variations the solution containing catalytic cations can comprise at least one chelator. In some variations, the catalytic cations can consist of Period 4 transition metal cations. In some variations the promoter cations can consist of alkali metal cations.

In another aspect, a catalyst is provided. The catalyst comprises a substrate that includes ceria, catalytic cations bound to substrate surfaces, and promoter cations bound to substrate surfaces. The catalytic cations can consist of transition metal cations, post-transition metal cations, or a combination thereof, and the promoter cations can consist of alkali or alkaline earth metal cations or a combination thereof. In some variations the catalytic cations can consist of Period 4 transition metals. In some variations the promoter cations consist of alkali metal cations. In some instances the catalyst catalyzes Reaction I, Reaction II, or both:

$$2NO+2H_2 \rightarrow N_2+H_2O \qquad I,$$

$$2NO+3H_2 \rightarrow 2NH_3+O_2 \qquad II.$$

In some particular instances, the catalyst possesses % $N_2$ selectivity greater than about 67% or greater than about 90% according to Equation A:

In another aspect a catalyst and its method of fabrication are provided. The method comprises contacting a substrate containing ceria with a solution containing catalytic cations and contacting the substrate with a solution containing promoter cations, wherein the catalytic cations consist of transition metal cations, post-transition metal cations, or a combination thereof, and the promoter cations consist of alkali or alkaline earth metal cations or a combination thereof. In some variations the solution containing catalytic cations can comprise at least one chelator. In some variations, the catalytic cations can consist of Period 4 transition metal cations. In some variations the promoter cations can consist of alkali metal cations.

BRIEF DESCRIPTION OF THE DRAWINGS

Various aspects and advantages of the invention will become apparent and more readily appreciated from the following description of the various aspects taken in conjunction with the accompanying drawings, of which:

FIG. 1 is a schematic representation of catalytic cations bound in various configurations to a surface of a substrate comprising ceria;

DETAILED DESCRIPTION

Figure 2A:
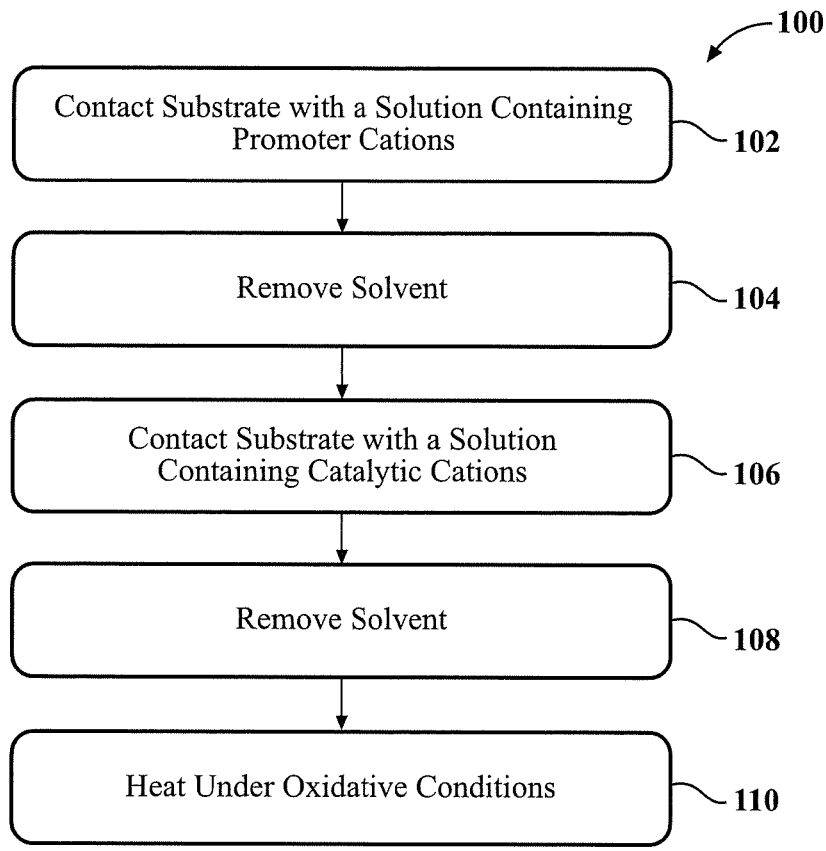
FIG. 2A is a flow-chart of one variation of a method for fabricating a catalyst.

A catalyst comprising ceria substrate surface-bound by catalytic cations, and a method for fabricating the catalyst, are provided. The method for fabricating the catalyst can include contacting a substrate with a solution containing catalytic cations and with a solution containing promoter cations. In certain variations, the solution containing catalytic cations can include chelated catalytic cations. The catalyst can comprise a ceria-based substrate, bound with catalytic cations of transition metal, post-transition metal, or both and with promoter cations of alkali metal, alkali earth metal, or both.

A method for fabricating a catalyst includes a step of contacting a substrate with a solution containing catalytic cations, alternatively referred to as a catalytic cation solution. The substrate comprises ceria, where "ceria" refers to an oxide of cerium. In different variations, the substrate can optionally include various ceramic or metal oxides, for example oxide of zirconium, aluminum, or silicon, in admixture with the ceria.

The substrate can include solid-phase material in any physical configuration. In some aspects, the substrate can include ceria which possesses high surface-area-to-mass ratio. In some variations, a high surface-area-to-mass ratio can be greater than about 20 $m^2 \cdot g^{-1}$. In some variations, a high surface-area-to-mass ratio can be greater than about 50 $m^2 \cdot g^{-1}$. In some variations, a high surface-area-to-mass ratio can be greater than about 75 $m^2 \cdot g^{-1}$. In some variations, a high surface-area-to-mass ratio can be greater than about 100 $m^2 \cdot g^{-1}$.

Suitable physical configurations of substrate that have high surface-to-mass-ratio can include a honeycomb structure, any porous structure, powder, or any other configuration which possesses high surface-area-to-mass ratio. In some instances the substrate will be present in a powder form with a particulate size of 25 nm to 200 μM. In some examples, the substrate will be present in a powder form with a surface-area-to-mass ratio of about 100 $m^2 \cdot g^{-1}$.

Suitable catalytic cations employed in the method can be taken from a group including transition metal cations and post-transition metal cations. In some aspects, the catalytic cations can include any transition metal cations or post-transition metal cations. As used herein, a transition metal can be any D-block metal of Groups 4-13. A post-transition metal can be any metal from the group including aluminum, gallium, indium, tin, thallium, lead, or bismuth. In some aspects, suitable catalytic cations can include cations of one or more Period 4 transition metals, a group including scandium, titanium, vanadium, chromium, manganese, iron, cobalt, nickel, copper, and zinc. In some instances, suitable catalytic cations will include cations of iron, copper, or cobalt, or combinations thereof.

In some aspects, the solution containing catalytic cations can include at least one chelator. As used herein, a chelator is a soluble, multidentate ligand capable of forming more than one coordinate bond with a central metal cation. Non-limiting examples of chelators that can be employed include ethylene diamine tetraacetic acid (EDTA), diethylene triamine pentaacetic acid (DTPA), ethylene glycol tetraacetic acid (EGTA), nitrilotriacetic acid (NTA), citric acid, ethylene diamine, 2,3-dimercapto-1-propanesulfonic acid, dimercaptosuccinic acid, desferrioxamine mesylate, oxalic acid, tartaric acid, or ascorbic acid. It is to be understood that a chelator can include either or both of a conjugate acid/base pair.

It is contemplated that in variations of the method in which a chelator is employed, a chelation complex between chelator and catalytic cations can be pre-formed prior to inclusion of the catalytic cations in the catalytic cation solution. As used herein, a chelation complex can be a coordination entity comprising at least one chelator molecule and a catalytic cation. In other instances, chelator and catalytic cations can be introduced separately to the solution containing catalytic cations.

Suitable chelators which can be employed in the method can include any chelator which can form a thermodynamically stable chelation complex with the catalytic cations. For example, a chelator can be chosen which forms a chelation complex with catalytic cations having a dissociation constant ($K_d$) less than 1 µM under standard conditions (aqueous solution at neutral pH, 25° C., and 1 atm pressure). A chelator can be chosen which forms a chelation complex having $K_d$ less than about 0.1 µM under standard conditions. A chelator can be chosen which forms a chelation complex having $K_d$ less than about 0.01 µM under standard conditions. A chelator can be chosen which forms a chelation complex having $K_d$ less than about 0.001 µM under standard conditions. As used herein, the dissociation constant is defined as the product of free catalytic cation concentration and free chelator concentration divided by the sum of all chelation complex species, including completely and partially coordinated complexes.

In variations of the catalyst fabrication method which employ a chelator, the catalytic cations can be described as "protected catalytic cations". Without being bound to any particular theory, and as illustrated schematically in FIG. 1, it is believed that performance of the method can cause catalytic cations to be bound to substrate surfaces in one or more distinct configurations. These configurations include isolated ions or small clusters, two-dimensional sheets, and three-dimensional crystallites. Again, without being bound to any particular theory, it is further believed that utilization of a chelator can influence the distribution of catalytic cations on substrate surfaces, in particular by inhibiting formation of isolated ions or small clusters.

It is contemplated that in instances in which a chelator is employed, chelator can be present in the catalytic cation solution at nearly equimolar quantity relative to catalytic cations. Alternatively, chelator can be present in molar excess of catalytic cations. In some instances, a suitable chelator will be one capable of forming a chelation complex with the catalytic metal cation, the complex having a net negative charge. In some instances, a suitable chelator will be a tetradentate ligand. In some instances, a suitable chelator will be EDTA.

The catalytic cations of the catalytic cation solution can comprise metal atoms in any positive oxidation state. Suitable oxidation states can in some instances include those in which the catalytic cations employed can form a thermodynamically stable chelation complex with any chelator employed.

The catalyst fabrication method can additionally include a step of contacting the substrate with a solution containing promoter cations, alternatively referred to as a promoter cation solution. Promoter cations can include cations of any element or elements from a group consisting of alkali metals and alkaline earth metals. In some instances, promoter cations can be cations of at least one of the following elements: lithium, sodium, potassium, rubidium, and cesium.

In some aspects of the method, the substrate can be contacted with the solution containing catalytic cations, the solution containing promoter cations, or both via incipient wetness impregnation (IWI). In IWI, the substrate is wetted with the incipient wetness volume, the minimum volume of solution needed to fill intra- and inter-particle volume. The incipient wetness volume can be determined by any suitable means. An example of suitable means for determining incipient wetness volume of the substrate is by total volume uptake during $N_2$ physisorption.

The solution containing catalytic cations and the solution containing promoter cations can each comprise a solvent. It is contemplated that a suitable solvent will include any solvent capable of solvating substrate surfaces, solvating promoter cation or a salt thereof, solvating catalytic cation or a salt or chelation complex thereof, or any combination of the aforementioned. In some instances, the solvent can be water. In some instances, the solvent can be mixed water/organic, such as water/methanol. In some instances, the solvent can be a polar organic solvent. The solution containing catalytic cations and the solution containing promoter cations can comprise identical or different solvents.

In some instances of the catalyst fabrication method that include a step of contacting the substrate with a promoter cation solution, the catalytic cation solution and the promoter cation solution can be distinct. In different variations of such instances, the substrate can be contacted with the promoter cation solution before or during its contact with the catalytic cation solution. In other instances the catalytic cation solution and the promoter cation solution can be the same solution, i.e. a single solution containing both promoter cations and catalytic cations can be employed.

In instances where the substrate is contacted with a promoter cation solution before the substrate is contacted with a catalytic cation solution, the solvent of the promoter cation solution can be removed from substrate prior to contacting the substrate with the catalytic cation solution. Such solvent removal can be achieved, for example, by heating or applying vacuum to the substrate.

In some additional aspects, contacting the substrate with a catalytic cation solution can be followed, directly or indirectly, by removing the solvent of the catalytic cation solution. In other additional aspects, contacting the substrate with a catalytic cation solution can be followed, directly or indirectly, by heating the catalyst under oxidative conditions. In yet other additional aspects, contacting the substrate with a catalytic cation solution can be followed, directly or indirectly, by solvent removal, and by heating the catalyst under oxidative conditions. As used herein, the phrase "under oxidative conditions" can mean: under conditions sufficient to oxidize organic matter adsorbed to the catalyst. Such organic matter could include, for example, chelator. Heating the substrate under oxidative conditions can serve to burn off any organic residues remaining from the IWI step(s) and or to evaporate any volatile components retained in the composition. In some variations the heating under oxidative conditions can comprise heating the catalyst to about 550° C. under ambient air.

In aspects of the method where contacting the substrate with a catalytic cation solution is followed by solvent removal, a sequence comprising those steps can be repeated at least one time. Such repetition can be useful, for example, in instances where the catalytic cation solution exists at concentration insufficiently high to yield a desired loading density of catalytic cations bound to the substrate.

FIG. 2A provides a schematic illustration of one possible format of a method 100 for fabricating a catalyst according to the present disclosure. In step 102, substrate can be modified by IWI with a solution containing promoter cation, for example a solution of $NaHCO_3$. In step 104, the solvent is removed, for example by placing the substrate under vacuum for an interval. Step 106 includes modification of the substrate by IWI with a solution containing catalytic cations, for example a solution of $NH_4FeEDTA$. In step 108, the solvent is removed, for example by placing the substrate under vacuum for an interval. In step 110, the substrate is heated under oxidative conditions.

Figure 2B:
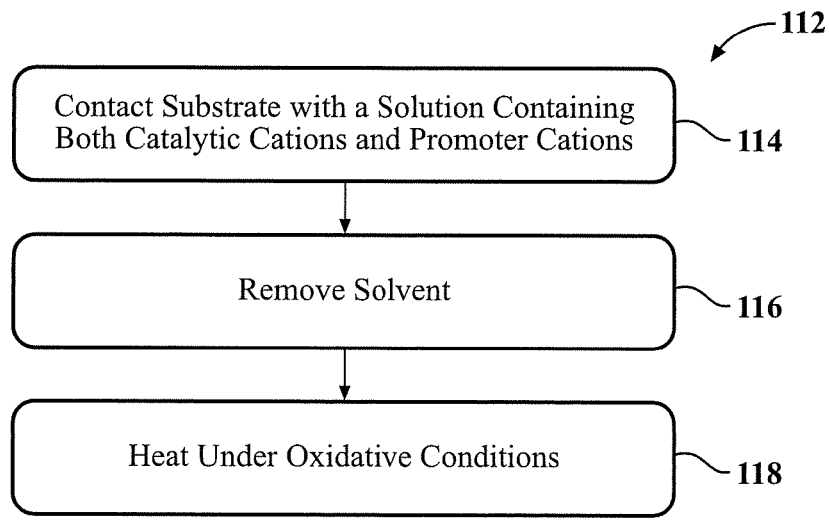
FIG. 2B is a flow-chart of another variation of a method for fabricating a catalyst.

FIG. 2B illustrates another possible format of a method 112 for fabricating a catalyst according to the present disclosure. In step 114, substrate is modified by IWI with a solution containing promoter cations and catalytic cations, for example a solution of NaFeEDTA. In step 116, the solvent is removed, for example by placing the substrate under vacuum for an interval. In step 118, the substrate is heated under oxidative conditions.

Also disclosed is a catalyst including a substrate and catalytic cations bound to substrate surfaces. The substrate comprises ceria, where "ceria" refers to an oxide of cerium. In different variations, the substrate can optionally include various ceramic or metal oxides, for example oxide of zirconium, aluminum, or silicon, in admixture with the ceria. The catalytic cations can be bound to substrate surfaces in geometries including isolated ions or small clusters, two-dimensional sheets, or three-dimensional crystallites, as schematically illustrated in FIG. 1. In some variations, catalytic cations can be bound to substrate surface predominantly in two-dimensional sheets.

A substrate can include solid-phase ceria in any physical configuration. In some aspects, the substrate can include ceria which possesses high surface-area-to-mass ratio. In some variations, a high surface-area-to-mass ratio can be greater than about 20 $m^2 \cdot g^{-1}$. In some variations, a high surface-area-to-mass ratio can be greater than about 50 $m^2 \cdot g^{-1}$. In some variations, a high surface-area-to-mass ratio can be greater than about 75 $m^2 \cdot g^{-1}$. In some variations, a high surface-area-to-mass ratio can be greater than about 100 $m^2 \cdot g^{-1}$.

It is to be understood that a substrate which possesses high surface-to-mass-ratio can include substrate with a honeycomb structure, substrate with a porous structure, a powder, or any other configuration which possesses high surface-area-to-mass ratio. In some instances the substrate will be present in a powder form with a particulate size of 25 nm to 200 μm. In some examples, the substrate will be present in a powder form with a surface-area-to-mass-ratio of about 100 $m^2 \cdot g^{-1}$.

In various aspects, the catalytic cations, which are bound to substrate surfaces, can comprise transition metal cations or post-transition metal cations. As used herein, a transition metal can be any D-block metal of Groups 4-13. A post-transition metal can be any metal from the group including aluminum, gallium, indium, tin, thallium, lead, or bismuth. Non-limiting examples of suitable catalytic cations can include cations of cadmium, cobalt, copper, chromium, iron, manganese, gold, silver, platinum, titanium, nickel, niobium, molybdenum, rhodium, palladium, scandium, vanadium, or zinc. In some aspects, suitable catalytic cations can be those capable of forming a stable chelation complex with a chelator.

In some aspects, the catalytic cations can be Period 4 transition metal cations, a group which includes cations of any of the following: scandium, titanium, vanadium, manganese, iron, cobalt, nickel, copper, or zinc. In some variations, the catalytic cations can consist of cations of one element. In other variations, the catalytic cations can include cations of more than one element. It is contemplated that catalytic cations can be bound to substrate surfaces by coordinate bonds. Such coordinate bonds can be oxide bonds.

Catalytic cations can be present in the catalyst at any loading density. As used herein, the phrase "loading density" refers to the fraction of catalyst which consists of catalytic cations. Loading density can sometimes be described in units of weight percent, at other times in units of moles of catalytic cations per mass of catalyst, and yet at other times in units of number of catalytic cations per surface area of catalyst. In some aspects, catalytic cations can be present at a loading density of at least 0.1 wt %. In other aspects, catalytic cations can be present at a loading density less than 2.0 wt %.

In some aspects, the catalytic cations can be present in the catalyst in quantity sufficient to exceed monolayer coverage of substrate surfaces. In other aspects, the catalytic cations can be present in the catalyst in quantity sufficient to achieve but not exceed monolayer coverage of substrate surfaces. In some aspects, the catalytic cations can be present in the catalyst in quantity insufficient to achieve monolayer coverage of substrate surfaces.

The catalyst can additionally include promoter cations bound to substrate surface. The promoter cations can include cations of an alkali metal or an alkaline earth metal. In some instances, suitable promoter cations can include cations of any element from a group consisting of lithium, sodium, potassium, rubidium, and cesium. It is to be understood that promoter cations can be bound to substrate surfaces by coordinate bonds, including oxide bonds. Oxides which can bind promoter cations to the substrate include oxide of cerium and oxide of catalytic cation.

Promoter cations can be present in the catalyst in any stoichiometric ratio relative to catalytic cations. In some instances, the stoichiometric ratio of coordinated promoter cations to catalytic cations can be within a range including 1:2, 6:1, or any intermediate ratio.

In some aspects, the catalyst can catalyze the reaction of gases which may be present in combustion exhaust, in particular gases which may be present in the combustion exhaust stream of an internal combustion engine. In some instances, the catalyst can catalyze the reduction of an oxide of nitrogen. In some instances, the catalyst can catalyze the specific reduction of nitric oxide.

In various instances the catalyst can catalyze Reaction I, Reaction II, or both:

$$2NO + 2H_2 \rightarrow N_2 + H_2O \qquad \text{I.}$$

$$2NO + 3H_2 \rightarrow 2NH_3 + O_2 \qquad \text{II.}$$

In instances where the catalyst catalyzes both Reactions I and II, the catalyst can be characterized as having a percent $N_2$ selectivity as defined according to Equation A:

$$\% \ N_2 \ \text{Selectivity} = \left( \frac{\text{moles NO consumed by Reaction I}}{\text{moles NO consumed by Reactions I and II}} \right) \times 100. \qquad \text{A}$$

Figure 3A:
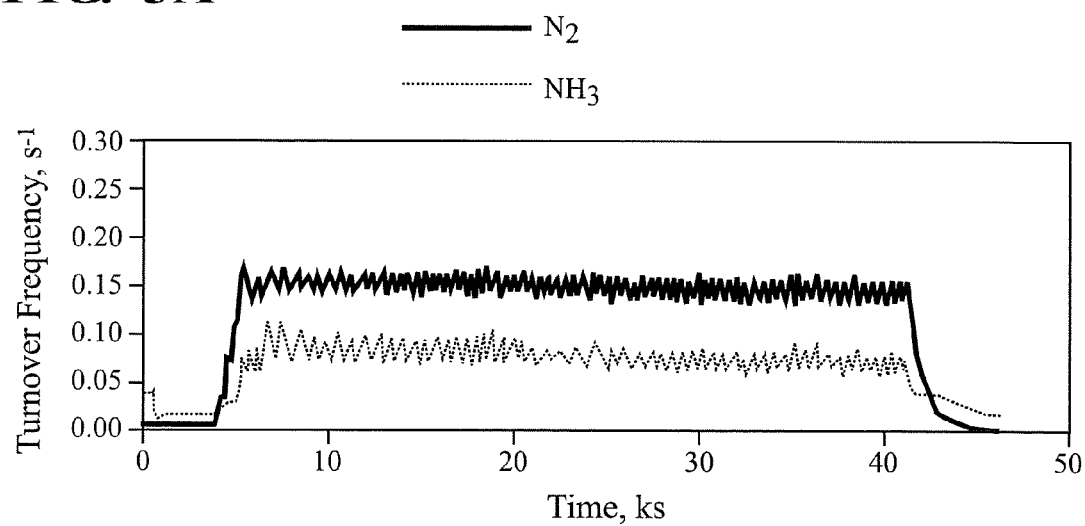
FIG. 3A is a kinetic trace of a nitric oxide reduction reaction in the presence of a catalyst.

In some instances, the catalyst can catalyze Reactions I and II with % $N_2$ selectivity equal to or greater than about 67%. In some instances $N_2$ selectivity can be equal to or greater than about 90%. FIG. 3A illustrates an instance of a catalyst catalyzing Reactions I and II with $N_2$ selectivity of about 67%. A catalyst was exposed to a 450° C. gas flow containing NO and $H_2$, effluent was monitored by mass spectrometry for $N_2$ and $NH_3$ content, and the results were converted to turnover frequency (TOF, moles of product per mole of catalyst per time) based on active catalytic cation quantity. Because the TOF is proportional to NO consumption for each reaction, the results show an approximately 2:1 preference for NO consumption by Reaction I, or an approximately 67% $N_2$ selectivity.

In other instances the catalyst can catalyze Reaction III or Reaction IV:

$$2NO+2CO \rightarrow N_2+2CO_2 \quad \text{III.}$$

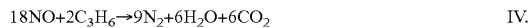

$$18NO+2C_3H_6 \rightarrow 9N_2+6H_2O+6CO_2 \quad \text{IV.}$$

In such instances, the catalyst can additionally or alternatively catalyze incomplete redox reactions between nitric oxide and carbon monoxide or propylene. Incomplete reactions can have products such as various nitrates or nitriles.

Figure 3B:
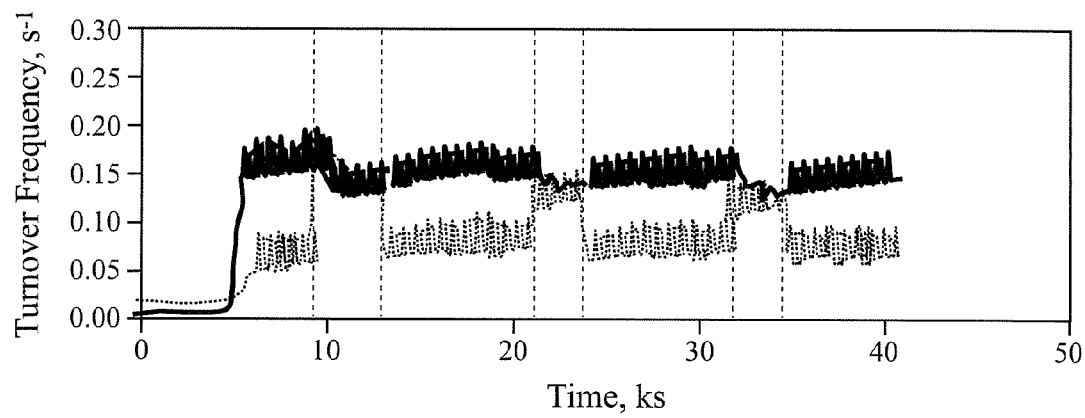
FIG. 3B is a kinetic trace of a nitric oxide reduction reaction in the presence of a catalyst and including three periods of deliberate water addition.

In certain aspects, the catalyst can be water stable, retaining catalytic activity after exposure to water. Other than through product formation, such exposure to water can occur, for example, through the presence of water vapor in a combustion exhaust stream to which the catalyst is exposed. Such an aspect is illustrated in FIG. 3B. The experiment shown in FIG. 3B is similar to that of FIG. 3A, but with the added feature of three temporary additions of water vapor of one hour duration each indicated by vertical dashed lines, wherein the $H_2$ inlet stream was diverted through an $H_2O$ bubbler. As shown, the catalyst retains ~90% activity during a water pulse and regains full activity once the water pulse ends. The apparent spike in $NH_3$ production during each water pulse is partially due to the mass spectrometer's inability to distinguish water from ammonia.

In some aspects, at least 30% of the catalytic cations bound to substrate can be capable of undergoing at least two reduction/oxidation cycles under conditions where reduction reaction temperatures do not exceed 550° C. These aspects of the catalyst are discussed in greater detail in Examples 41-44, below.

Also disclosed is a catalyst comprising a substrate and catalytic cations, fabricated by a method including contacting a ceria substrate with a solution containing promoter cations and contacting the substrate with a solution containing catalytic cations. The substrate comprises a preparation of ceria, and can in some variations include a ceramic or metallic oxide in admixture with the ceria.

In various aspects, the substrate can include solid-phase ceria in any physical configuration. In some aspects, the substrate can include ceria which possesses high surface-area-to-mass ratio. In some variations, a high surface-area-to-mass ratio can be greater than about 20 $m^2 \cdot g^{-1}$. In some variations, a high surface-area-to-mass ratio can be greater than about 50 $m^2 \cdot g^{-1}$. In some variations, a high surface-area-to-mass ratio can be greater than about 75 $m^2 \cdot g^{-1}$. In some variations, a high surface-area-to-mass ratio can be greater than about 100 $m^2 \cdot g^{-1}$.

It is to be understood that a ceria support comprising ceria which possesses high surface-to-mass-ratio can include ceria substrate with a honeycomb structure, ceria substrate with a porous structure, ceria powder, or any other configuration which possesses high surface-area-to-mass ratio. In some instances the ceria support will be present in a powder form with a particulate size of 25 nm to 200 μm. In some examples, the ceria support will be present in a powder form with a surface area of about 100 $m^2 \cdot g^{-1}$.

Catalytic cations can include transition metal or post-transition metal cations bound to substrate surfaces. In some variations, catalytic cations can include Period 4 transition metals. Catalytic cations can become coordinated by the surface of the substrate when the substrate is contacted by a solution containing catalytic cations. Catalytic cations can be coordinated by the surface of the substrate via oxide bonds. Catalytic cations can be arrayed on the surface of the substrate in isolated ions or small clusters, two-dimensional sheets, three-dimensional sheets, or combinations thereof.

A solution containing catalytic cations can include a salt comprising catalytic cations. In some instances, a solution containing catalytic cations can include a chelator. As noted above, catalytic cations which are coordinated by a chelator can be referred to as chelated catalytic cations, or as protected catalytic cations.

Suitable promoter cations which can be employed in the solution containing promoter cations can include cations of alkali metal, cations of alkaline earth metal, or both. In some instances, promoter cations can be cations of at least one element from a group consisting of lithium, sodium, potassium, rubidium, and cesium.

In some aspects, the catalyst can catalyze the reaction of gases which may be present in combustion exhaust, in particular gases which may be present in the combustion exhaust stream of an internal combustion engine. In some instances, the catalyst can catalyze the reduction of an oxide of nitrogen. In some instances, the catalyst can catalyze the specific reduction of nitric oxide.

As illustrated by the following Examples, catalysts according to the disclosure which are fabricated by a method wherein the solution containing catalytic cations includes chelated catalytic cations can have catalytic properties different from those of catalysts fabricated by a method in which chelated catalytic cations are not employed. Without being bound to any particular theory, it is believed that a method which employs protected catalytic cations in the solution containing catalytic cations can enhance the formation of two-dimensional sheets, possibly by sterically and/or electronically blocking the catalytic cations from adsorbing to isolated sites on substrate surfaces. In this aspect, chelators which possess significant steric bulk and/or chelators whose chelation complexes with catalytic cations have net negative charge can be useful.

EXAMPLES

The following Examples are presented for illustrative purposes only and are not to be interpreted as limiting the scope of the present invention. The Examples will enable a clearer understanding of the characteristics and advantages of the invention.

Examples 1-33 describe the fabrication of various catalysts according to the methods of FIGS. 3A, 3B. In Examples 1-19, substrate was ceria and catalytic cations were ferric. Solutions containing catalytic cations included either protected (NaFeEDTA or $NH_4FeEDTA$) or unprotected ($Fe(NO_3)_3$) cations. Examples whose fabrication included the use of NaFeEDTA were fabricated according to the method of FIG. 3B. Examples whose fabrication included the use of $NH_4FeEDTA$ or $Fe(NO_3)_3$ were fabricated according to the method of FIG. 3A, with steps 106 and 108 included in some, but not all, such Examples.

Except as otherwise noted, substrate was NanoTek $CeO_2$ powder, obtained from C.I. Kasei Co., Ltd, and having surface-area-to-mass ratio of 101 $m^2 \cdot g^{-1}$. Substrate was dried at 120° C. under ambient atmosphere for >12 h before use. All other reagents were obtained from Sigma-Aldrich and used as received. $N_2$ physisorption isotherms were obtained using a Micromeritics ASAP 2010 analyzer. Promoter-modified and unmodified supports were degassed for 6 h at >5 mTorr and 120° C. to release absorbed water prior to physisorption. Elemental analysis of catalyst compositions was with a Varian MPX ICP-OES instrument.

Examples 34-58 describe various analytical techniques applied to the catalysts of Examples 1-33, probing their chemical, structural, and catalytic properties.

Examples 1-3

NaFeEDTA and NH$_4$FeEDTA were prepared by stirring 10 mmol H$_4$EDTA and 10 mmol Fe(NO$_3$)$_3$.9H$_2$O in 25 mL of H$_2$O at 60° C. until all solids dissolved. Once dissolved, 40 mmol NaHCO$_3$ or NH$_4$HCO$_3$ was added slowly, and the resulting solution was reduced to 5 mL by rotary evaporation and stored at −20° C. overnight. The resulting crystals were separated by filtration, washed in acetone, and dried at 20 mTorr for 12 hours. Thermogravimetric analysis indicated >99% purity of the ferric chelates.

(NH$_4$)$_2$CoEDTA was prepared by stirring 10 mmol H$_4$EDTA and 10 mmol Co(NO$_3$)$_3$.6H$_2$O in 25 mL of H$_2$O at 60° C. until all solids dissolved. Once dissolved, 40 mmol NH$_4$HCO$_3$ was added slowly, and the resulting solution was completely reduced by rotary evaporation. The complex was purified by heating under vacuum to remove residual NH$_4$NO$_3$.

Examples 4-6

Catalysts were fabricated with a ceria substrate bound with unprotected, ferric catalytic cations and sodium promoter cations in a 1:1 stoichiometric ratio of catalytic-to-promoter cations. Ceria powder was contacted with an IWI volume with concentration of 200, 400, or 600 mM NaHCO$_3$. The modified substrates were dried in a partially covered container under ambient conditions for 24 hours, then heated to 120° C. for 12 hours. Each of the modified substrates was then placed in an IWI volume of the same concentration (200, 400, or 600 mM, respectively) of Fe(NO$_3$)$_3$. The catalysts were dried for 24 hours in partially covered containers for 24 hours under ambient atmosphere, and then for 12 hours under dynamic vacuum (~20 mTorr). The dried catalysts were heated from room temperature to 550° C. under ambient, static air at a temperature ramp rate of 10° C./min.

Examples 7-13

Catalysts were fabricated with protected ferric catalytic cations and sodium promoter cations in a single solution. CeO$_2$ powder with surface area of 101 m$^2$·g$^{-1}$ was placed in an incipient wetness volume, determined by N$_2$ physisorption, with a concentration of 100, 200, or 300 mM NaFeEDTA as prepared in Example 1. The impregnated materials were dried for 24 hours in partially covered containers for 24 hours under ambient atmosphere, and then for 12 hours under dynamic vacuum (~20 mTorr). Because the solubility of NaFeEDTA limited the loading density from a single impregnation to about 0.6 Fe.nm$^{-2}$, multiples rounds of impregnation and drying were used to achieve higher densities. The dried catalysts were heated from room temperature to 550° C. under ambient, static air at a temperature ramp rate of 10° C./min.

Examples 14-15

Catalysts were fabricated with protected, ferric catalytic cations and with no promoter cations. Ceria powder was placed in an incipient wetness volume, determined by N$_2$ physisorption, containing 100 or 200 mM NH$_4$FeEDTA as prepared in Example 2. The impregnated materials were dried for 24 hours in partially covered containers for 24 hours under ambient atmosphere, and then for 12 hours under dynamic vacuum (~20 mTorr). The dried catalysts were heated from room temperature to 550° C. under ambient, static air at a temperature ramp rate of 10° C./min.

Examples 16-19

Catalysts were fabricated with protected, ferric catalytic cations and with a series of alkali metal promoter cations, at 1:1 stoichiometric ratios. Ceria powder was placed in an incipient wetness volume of concentrations of 100 mM LiOH, NaHCO$_3$, KHCO$_3$, or CsHCO$_3$. The modified material was dried in a partially covered container under ambient conditions for 24 hours, then heated to 120° C. for 12 hours to produce a series of alkali-modified supports. The modified, dried material was then placed in an IWI volume with a concentration of 100 mM NH$_4$FeEDTA as prepared in Example 2. The impregnated catalysts were dried for 24 hours in partially covered containers for 24 hours under ambient atmosphere, and then for 12 hours under dynamic vacuum (~20 mTorr). The dried catalysts were heated from room temperature to 550° C. under ambient, static air at a temperature ramp rate of 10° C./min.

Examples 20-22

Catalysts were fabricated with protected, ferric catalytic cations at ~0.5 Fe.nm$^{-2}$ and with sodium promoter cations at varying loading densities. Ceria powder was placed in an IWI volume of concentration of 100, 200, or 300 mM NaHCO$_3$ and the modified substrates were dried in a partially covered container under ambient conditions for 24 hours, then heated to 120° C. for 12 hours. The modified substrates were then placed in an IWI volume of concentration 200 mM NH$_4$FeEDTA as prepared in Example 2. The impregnated materials were dried for 24 hours in partially covered containers for 24 hours under ambient atmosphere, and then for 12 hours under dynamic vacuum (~20 mTorr). The dried catalysts were heated from room temperature to 550° C. under ambient, static air at a temperature ramp rate of 10° C./min.

Examples 23-30

Catalysts were fabricated with protected cupric catalytic cations and sodium promoter cations in a single solution. Ceria powder with surface area of 101 m$^2$·g$^{-1}$ was placed in an incipient wetness volume, determined by N$_2$ physisorption, containing 100, 200, or 300 mM Na2CuEDTA purchased from Sigma. The impregnated materials were dried for 24 hours in partially covered containers for 24 hours under ambient atmosphere, and then for 12 hours under dynamic vacuum (~20 mTorr). Because the solubility of Na2CuEDTA limited the loading density from a single impregnation to about 0.6 Cu.nm$^{-2}$, multiple rounds of impregnation and drying were used to achieve higher densities. The dried catalysts were heated from room temperature to 550° C. under ambient, static air at a temperature ramp rate of 10° C./min.

Examples 31-33

CeO$_2$/ZrO$_2$ powder with surface area of 108 m$^2$·g$^{-1}$ was placed in an IVO volume of KHCO$_3$. The impregnated material was dried in a partially covered container under ambient conditions for 24 hours, then heated to 120° C. for 12 hours to produce the alkali-modified substrate. The promoter cation modified substrate was placed in an incipient wetness volume with concentration of 200 mM $(NH_4)_2CoEDTA$. The impregnated material, in partially covered containers, was dried for 24 hours under ambient atmosphere, and then for 12 hours under dynamic vacuum (~20 mTorr). Otherwise equivalent catalysts were fabricated using protected ferric or cupric catalytic cations rather than cobaltous. Stoichiometric ratios of promoter cations to catalytic cations were 1:1 for the ferric and cobaltous containing catalysts, and 2:1 for the cupric containing catalyst. The loading density of catalytic cations was ~0.4 cations per $nm^2$, equivalent to about 0.4% by weight.

TABLE 1

Characteristics of the materials discussed in Examples 4-31

| Example | Catalytic Cation Precursor | Promoter Cation Precursor | Catalytic Cation Loading Density | | | Cat./Prom. Ratio |
|---|---|---|---|---|---|---|
| | | | wt % | $\mu mol \cdot g^{-1}$ | $atom \cdot nm^{-2}$ | |
| 4 | $Fe(NO_3)_3$ | $NaHCO_3$ | 0.43 | 82 | 0.49 | 1:1 |
| 5 | $Fe(NO_3)_3$ | $NaHCO_3$ | 0.87 | 164 | 0.98 | 1:1 |
| 6 | $Fe(NO_3)_3$ | $NaHCO_3$ | 1.35 | 255 | 1.52 | 1:1 |
| 7 | NaFeEDTA | N.A. | 0.18 | 32 | 0.19 | 1:1 |
| 8 | NaFeEDTA | N.A. | 0.34 | 60 | 0.36 | 1:1 |
| 9 | NaFeEDTA | N.A. | 0.52 | 92 | 0.55 | 1:1 |
| 10 | NaFeEDTA | N.A. | 0.53 | 94 | 0.56 | 1:1 |
| 11 | NaFeEDTA | N.A. | 0.81 | 145 | 0.87 | 1:1 |
| 12 | NaFeEDTA | N.A. | 1.16 | 207 | 1.23 | 1:1 |
| 13 | NaFeEDTA | N.A. | 1.38 | 246 | 1.47 | 1:1 |
| 14 | $NH_4FeEDTA$ | none | 0.23 | 41 | 0.24 | 1:0 |
| 15 | $NH_4FeEDTA$ | none | 0.48 | 86 | 0.51 | 1:0 |
| 16 | $NH_4FeEDTA$ | LiOH | 0.22 | 40 | 0.27 | 1:1 |
| 17 | $NH_4FeEDTA$ | $NaHCO_3$ | 0.23 | 41 | 0.27 | 1:1 |
| 18 | $NH_4FeEDTA$ | $KHCO_3$ | 0.23 | 42 | 0.28 | 1:1 |
| 19 | $NH_4FeEDTA$ | $CsHCO_3$ | 0.22 | 39 | 0.26 | 1:1 |
| 20 | $NH_4FeEDTA$ | $NaHCO_3$ | 0.47 | 83 | 0.50 | 2:1 |
| 21 | $NH_4FeEDTA$ | $NaHCO_3$ | 0.49 | 87 | 0.52 | 1:1 |
| 22 | $NH_4FeEDTA$ | $NaHCO_3$ | 0.49 | 87 | 0.52 | 2:3 |
| 23 | $Na_2CuEDTA$ | N.A. | 0.23 | 36 | 0.22 | 1:2 |
| 24 | $Na_2CuEDTA$ | N.A. | 0.31 | 49 | 0.29 | 1:2 |
| 25 | $Na_2CuEDTA$ | N.A. | 0.36 | 57 | 0.34 | 1:2 |
| 26 | $Na_2CuEDTA$ | N.A. | 0.61 | 96 | 0.57 | 1:2 |
| 27 | $Na_2CuEDTA$ | N.A. | 0.54 | 86 | 0.51 | 1:2 |
| 28 | $Na_2CuEDTA$ | N.A. | 0.89 | 139 | 0.83 | 1:2 |
| 29 | $Na_2CuEDTA$ | N.A. | 1.21 | 191 | 1.14 | 1:2 |
| 30 | $Na_2CuEDTA$ | N.A. | 1.51 | 236 | 1.41 | 1:2 |
| 31 | $NH_4CoEDTA$ | $KHCO_3$ | 0.42 | 71 | 0.4 | 1:1 | and ground with a mortar and pestle before collecting spectra. Diffuse reflectance spectra were converted to pseudo-absorption spectra using the Kubelka Munk transform (Kubelka et al. Z. Tech. Phys. 12, 593-6011 (1931)).

Figure 4A:
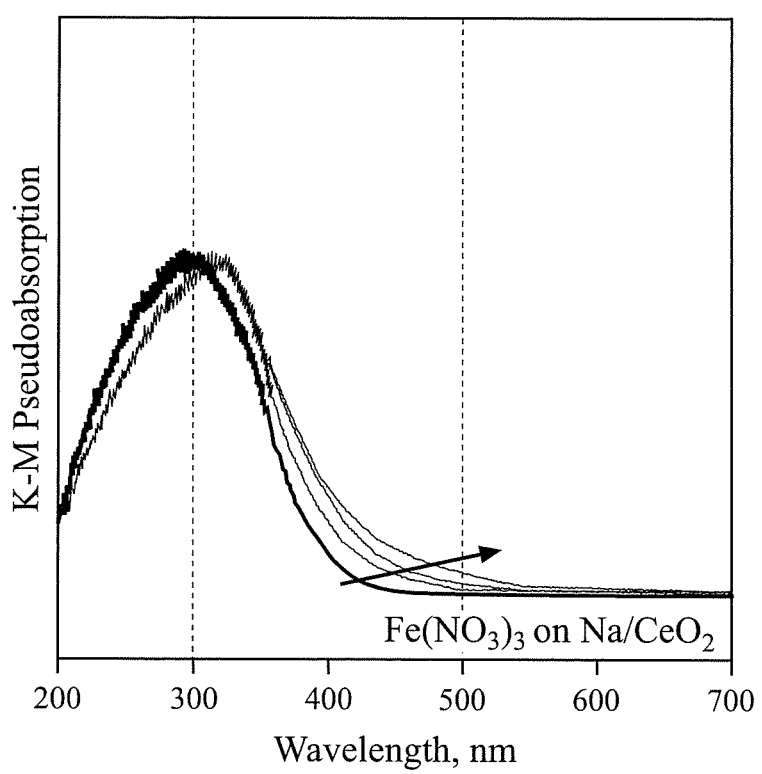
FIG. 4A is a DRUV-vis spectrum of a catalyst fabricated using $Fe(NO_3)_3$ on $Na/CeO_2$.
Figure 4B:
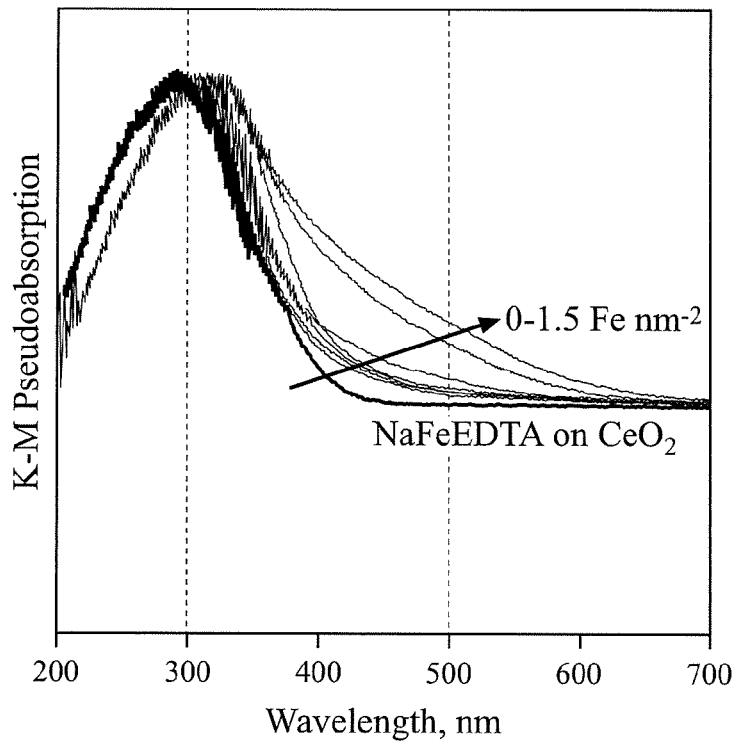
FIG. 4B is a DRUV-vis spectrum of a catalyst fabricated using NaFeEDTA on $CeO_2$.

Representative DRUV-vis spectra are shown in FIGS. 4A and 4B for catalysts incorporated with sodium promoter cations and with varying loading densities of ferric catalytic cations, where the light lines are the catalysts and the heavy lines are ceria substrate as reference. The catalysts shown in FIG. 4A were fabricated according to Examples 4-6, while the catalysts shown in FIG. 4B were fabricated according to Examples 7-13. The spectra of FIG. 4A have minimal shoulder on the ceria peak below 500 nm and virtually none Examples 34-35

Diffuse Reflectance UV-Vis

Catalysts fabricated according to Examples 4-13 were analyzed by diffuse reflectance UV-visible (DRUV-vis) in order to evaluate the geometry of coordination of catalytic cations on substrate surfaces, as a function of catalytic cation loading density and protected or unprotected nature of the catalytic cations. Isolated $Fe^{3+}$ ions are expected to absorb below 300 nm, two-dimensional sheets are expected to absorb between 300 nm and 500 nm, and three-dimensional crystallites are expected to absorb above 500 nm. Bands corresponding to isolated $Fe^{3+}$ are obscured by the dominant absorption of $CeO_2$ below 350 nm, while bands corresponding to two-dimensional sheets and three-dimensional crystallites can appear as a shoulder on the $CeO_2$ band and as a peak centered at λ>500 nm, respectively.

DRUV-vis experiments were performed on a Shimadzu 3600 UV-visible-NIR spectrometer with a Harrick Praying Mantis diffuse reflection attachment and with PTFE as the baseline standard. All materials were diluted 1:5 in PTFE above 500 nm, even at the highest ferric loading densities. This suggests that unprotected catalytic cations are incorporated in the catalyst predominantly as isolated ions or small clusters.

The spectra of FIG. 4B have a shoulder below 500 nm even at the lowest catalytic cation loading densities. At the highest loading densities, particularly above 0.6 catalytic cations per $nm^2$, the spectra in FIG. 4B have large shoulders below 500 nm, and significant absorption above 500 nm. This suggests that use of protected catalytic cations in the catalyst fabrication method enhances incorporation of catalytic cations into two-dimensional sheets and, at high loading densities, into three-dimensional crystallites.

Examples 36-40

Temperature Programmed Reduction

Temperature-programmed reduction (TPR) experiments were performed on catalysts fabricated according to Examples 4-13 in order to evaluate the catalytic cation reduction ($H_2O$ release) for catalysts fabricated with protected vs. unprotected catalytic cations. Monomeric catalytic cation structures interacting strongly with substrate oxide support are expected to reduce at higher temperature than agglomerates more closely resembling bulk oxides of catalytic cations. For example, isolated ferric cations are expected to reduce between 600° C. and 700° C., while two-dimensional sheets and three-dimensional crystallites should reduce at around 400-500° C. and 300-400° C., respectively.

TPR experiments were performed on a TA Instruments Q500 TGA equipped with a Pfeiffer Thermostar Q200 process mass spectrometer. The compositions were gradually heated to 550° C. at a temperature gradient of 10° C.·min$^{-1}$ under a flow of 90% $O_2$/10% He at 100 standard cubic centimeters per minute (sccm) and held for 15 minutes. The heat treated samples were cooled in 100 sccm He to near ambient temperature before being heated at 10° C.·min$^{-1}$ to 550° C. in 100 sccm 4.5% $H_2$, 4.5% Ar, 91% He. The evolved water signal was normalized against the constant argon signal and calibrated against a cupric oxide reference standard.

Figure 5A:
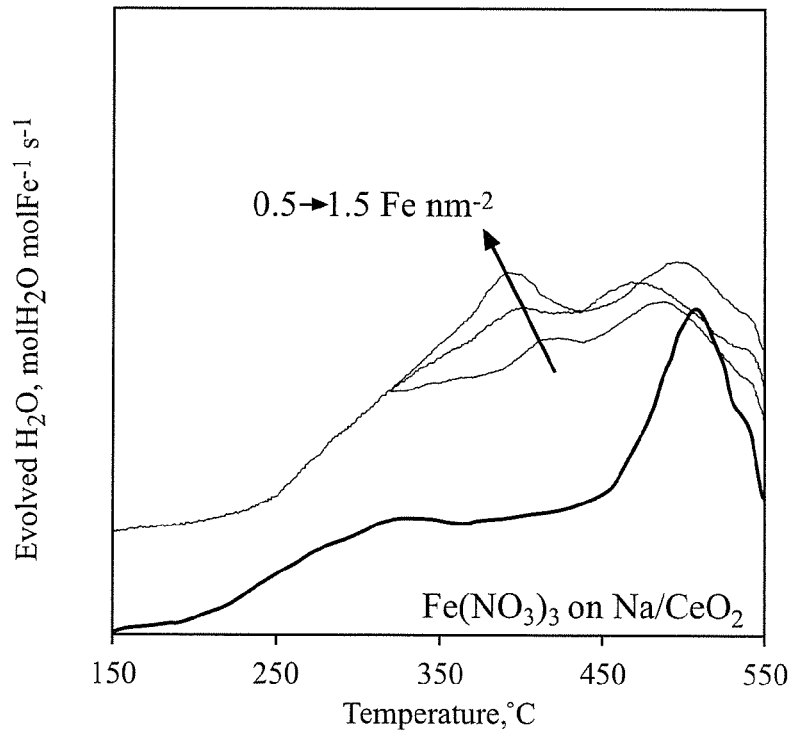
FIG. 5A is a temperature-programmed reduction trace of a catalyst fabricated using $Fe(NO_3)_3$ on $Na/CeO_2$.
Figure 5B:
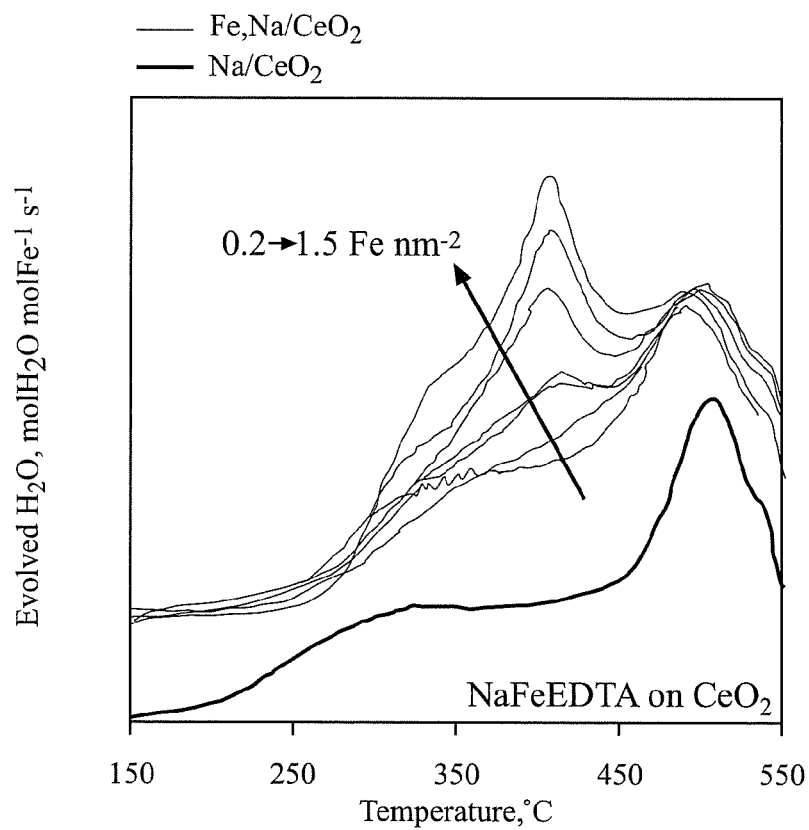
FIG. 5B is a temperature-programmed reduction trace of a catalyst fabricated using NaFeEDTA on $CeO_2$.

Representative TPR scans can be seen in FIGS. 5A, 5B. Those in FIG. 5A are of catalysts fabricated according to Examples 4-6, while those in FIG. 5B are of catalysts fabricated according to Examples 7-13. In FIGS. 5A, 5B the heavy line represents a scan of substrate only, while light lines represent scans of catalysts at varying catalytic cation loading densities. Scans of catalysts are offset from the scans of substrate, for clarity. Catalysts fabricated using protected catalytic cations, as shown in FIG. 5B show large increases in evolved water at increased catalytic cation loading density, particularly at around 300-400° C. Catalysts fabricated using unprotected catalytic cations, as shown in FIG. 5A show much smaller increases in evolved oxygen even at high loading densities.

Figure 6A:
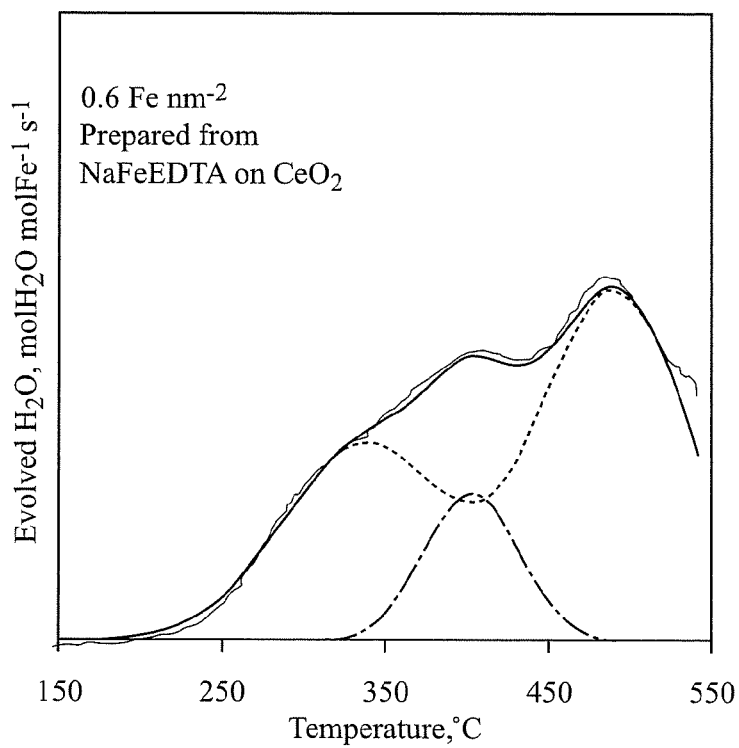
FIG. 6A is a deconvoluted temperature-programmed reduction trace of a catalyst fabricated using NaFeEDTA on $CeO_2$ at moderate loading density.
Figure 6B:
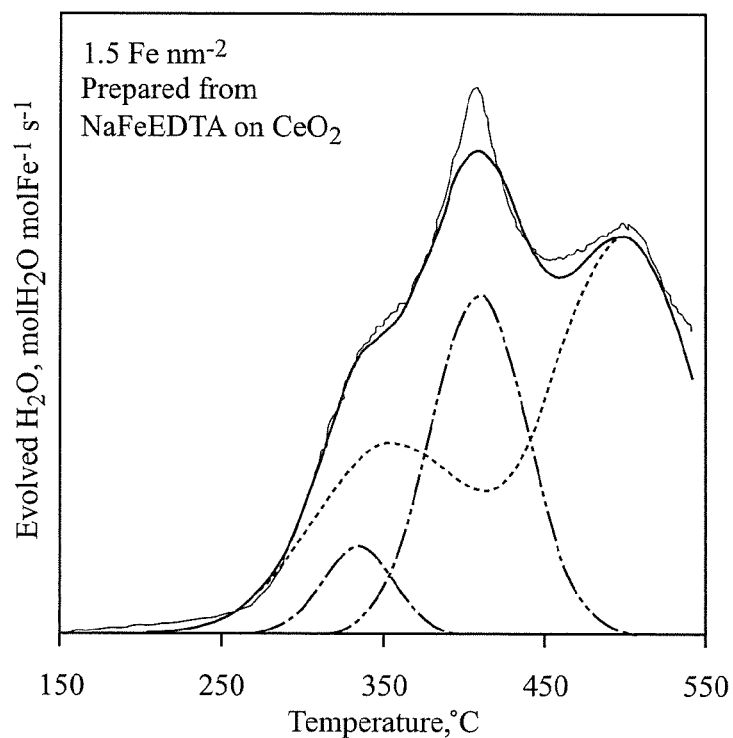
FIG. 6B is a deconvoluted temperature-programmed reduction trace of a catalyst fabricated using NaFeEDTA on $CeO_2$ at high loading density.

FIGS. 6A, 6B, show TPR peak deconvolution and assignment for catalysts fabricated according to Examples 9 and 12, respectively. The light solid line shows the acquired data for the catalyst while the dotted line shows the background TPR scan of ceria substrate. The dash-dotted line(s) indicate new, deconvoluted peaks, representing the difference between TPR of catalyst and substrate. The heavy solid line shows the computed spectrum of background plus 400° C. peak, and its close agreement with the acquired spectrum. FIG. 6A shows only a single deconvoluted peak centered at about 400° C., while FIG. 6B has a much larger deconvoluted peak centered at about 400° C. and a second deconvoluted peak centered at about 325° C. Because of its lower temperature and presence only in catalysts fabricated at high loading densities, the reduction event centered at about 325° C. is assigned to reduction of ferric catalytic cations in three-dimensional aggregates. The reduction event centered at about 400° C. is assigned to reduction of ferric catalytic cations in two-dimensional sheets.

Figure 7:
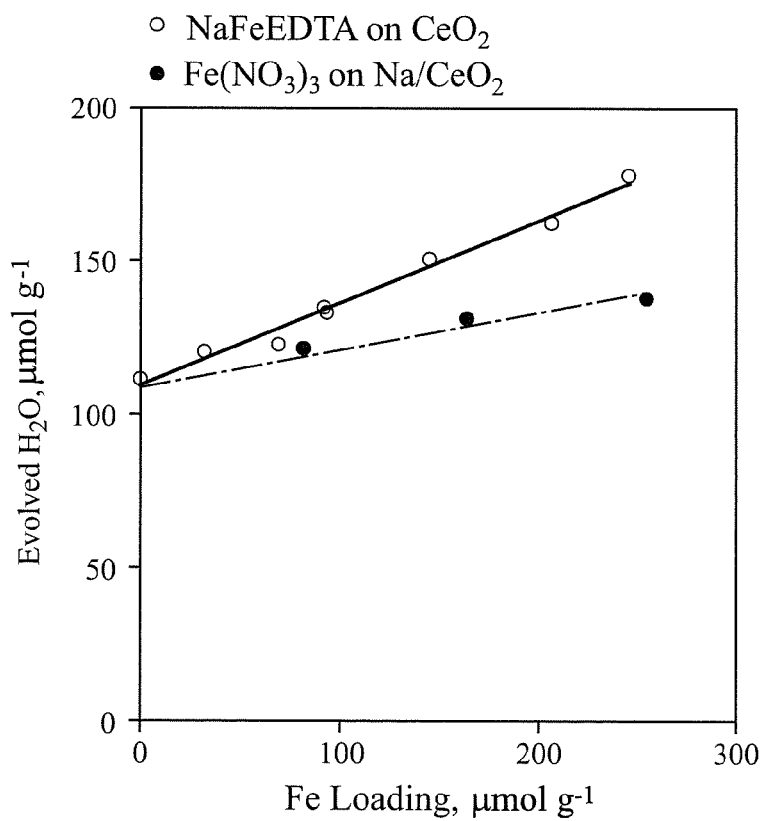
FIG. 7 is a graph of catalytic cation reduction for two catalyst types at varying loading densities.

FIG. 7 is a graph of total evolved oxygen as a function of $Fe^{3+}$ catalytic cation loading density, for catalysts fabricated using protected cations (solid line) and unprotected catalytic cations (dotted line). The slope of the solid line, 0.23 moles of $H_2O$ per mole of $Fe^{3+}$ catalytic cation, corresponds to reduction of 45% of the catalytic cations in the catalyst fabricated using protected catalytic cations over the temperature range of the TPR (because two $Fe^{3+}$ cations must be reduced for each $H_2O$ molecule produced). By contrast, the slope of the dotted line, 0.11 moles of $H_2O$ per mole of $Fe^{3+}$ catalytic cation, corresponds to reduction of only 22% of the catalytic cations in the catalyst fabricated using unprotected catalytic cations over the temperature range of the TPR.

Taken together, these results suggest that use of protected catalytic cations in the method results in a catalyst with catalytic cations which are bound in lower proportion as isolated ions and in higher proportion in two-dimensional sheets. The results further suggest that the increase in population of two-dimensional sheets results in a greater fraction of catalytic cations which are available for reduction within the tested temperature range.

Examples 41-44

Multiple cycles of TPR (i.e. redox cycles) were performed on catalysts fabricated according to Examples 4-13. This enabled an assessment of the redox cycling capability of catalytic cations, and in particular of catalytic cations bound to substrate surfaces in different geometries.

Samples were analyzed as in the TPR experiments (Examples 31-35), with the following additional steps. After the initial TPR scan, samples were cooled to near ambient temperature in 100 sccm helium, and then oxidized, cooled, and gradually reduced a second time, as in the initial TPR experiment.

Figure 8A:
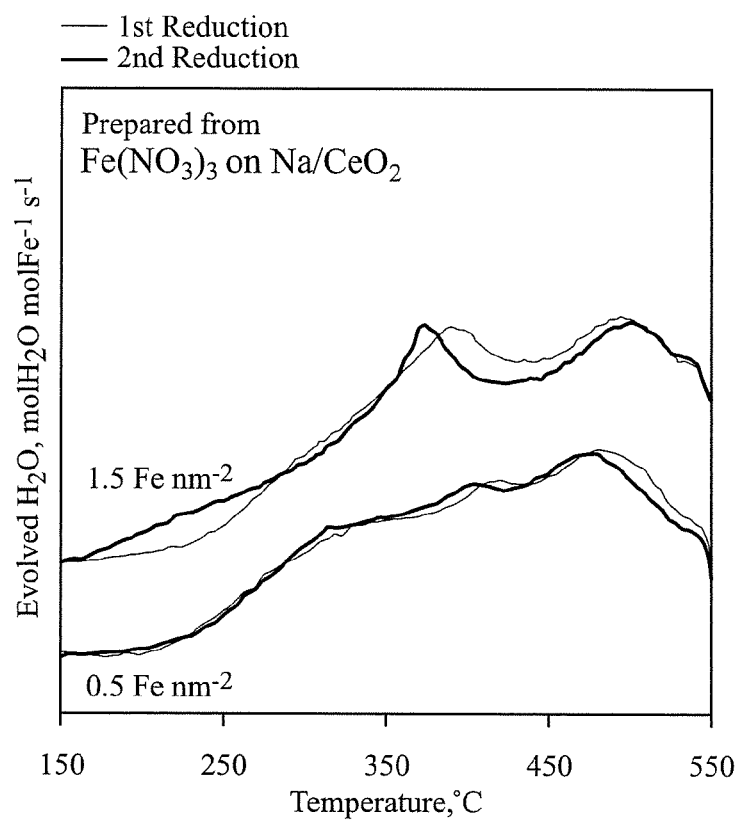
FIG. 8A is a redox cycled temperature-programmed reduction trace of a catalyst fabricated using $Fe(NO_3)_3$ on $Na/CeO_2$.
Figure 8B:
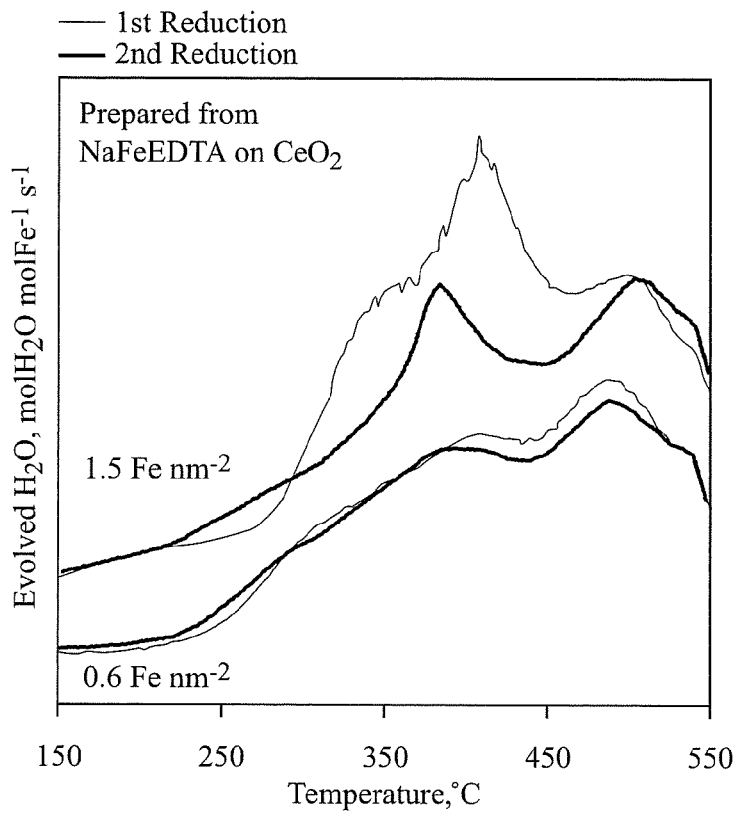
FIG. 8B is a redox cycled temperature-programmed reduction trace of a catalyst fabricated using NaFeEDTA on $CeO_2$.

FIGS. 8A, 8B show TPR scans of first and second reductions, at two catalytic cation loading densities, for catalysts fabricated using unprotected catalytic cations and protected catalytic cations, respectively. As seen in FIG. 8A, the second reduction was the same as the first reduction for catalysts fabricated using unprotected catalytic cations, except that the reduction feature centered at about 400° C. was shifted to about 380° C. As seen in FIG. 8B, the second reduction was essentially the same as the first reduction for catalysts fabricated using protected catalytic cations when the catalytic cations were incorporated at low loading densities. At high loading densities however, the reduction event centered at about 325° C., assigned to reduction of catalytic cations incorporated in three-dimensional crystallites, disappeared completely. This suggests that catalytic cations incorporated in three-dimensional crystallites are relatively unable to undergo redox cycles, as can be the case for bulk oxides.

Figure 9A:
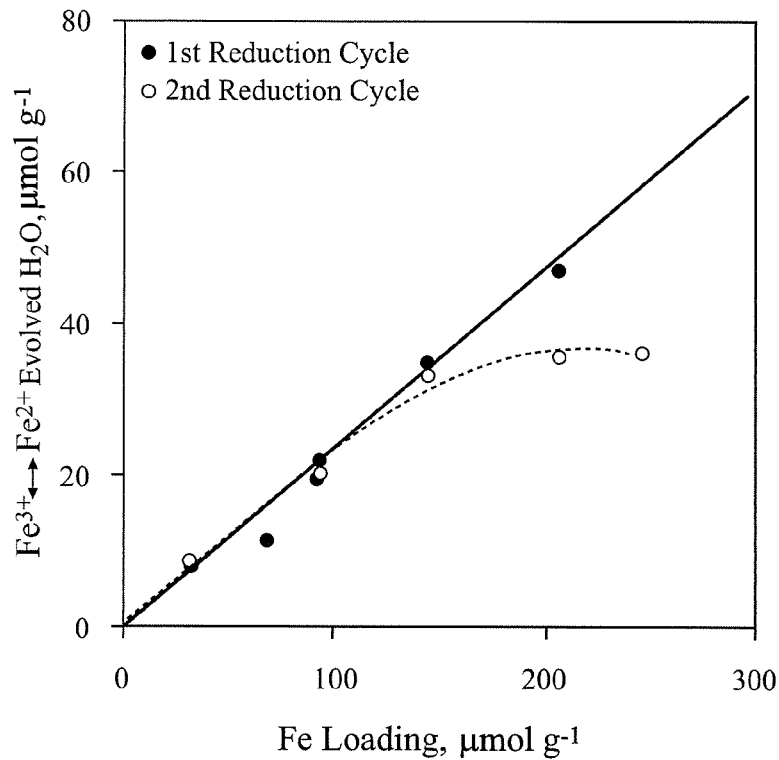
FIG. 9A is a graph of first and second cycle catalytic cation reductions of a catalyst fabricated using NaFeEDTA on $CeO_2$.
Figure 9B:
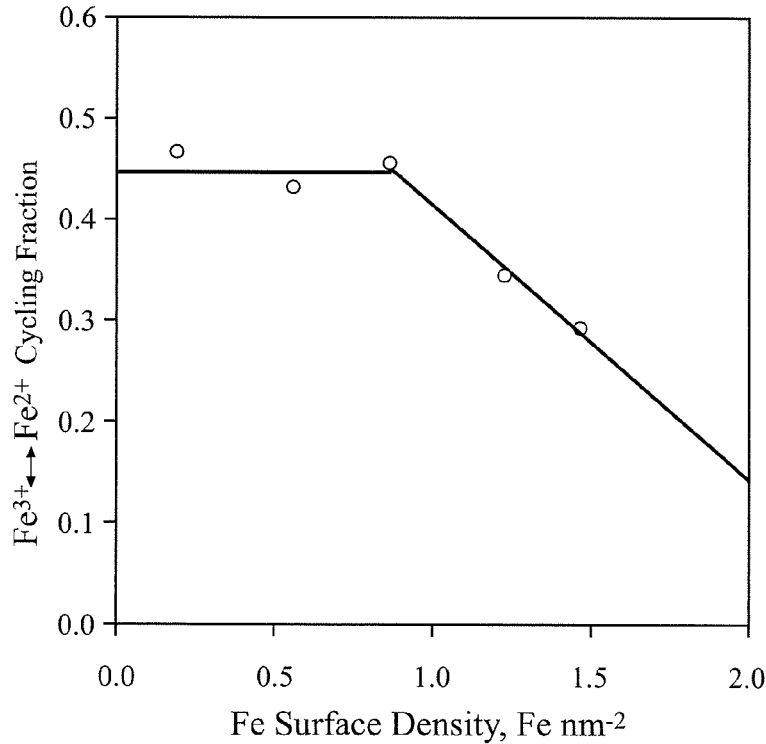
FIG. 9B is a plot of catalytic cation redox cycling fraction as a function of loading density for a catalyst fabricated using NaFeEDTA on $CeO_2$.
Figure 10A:
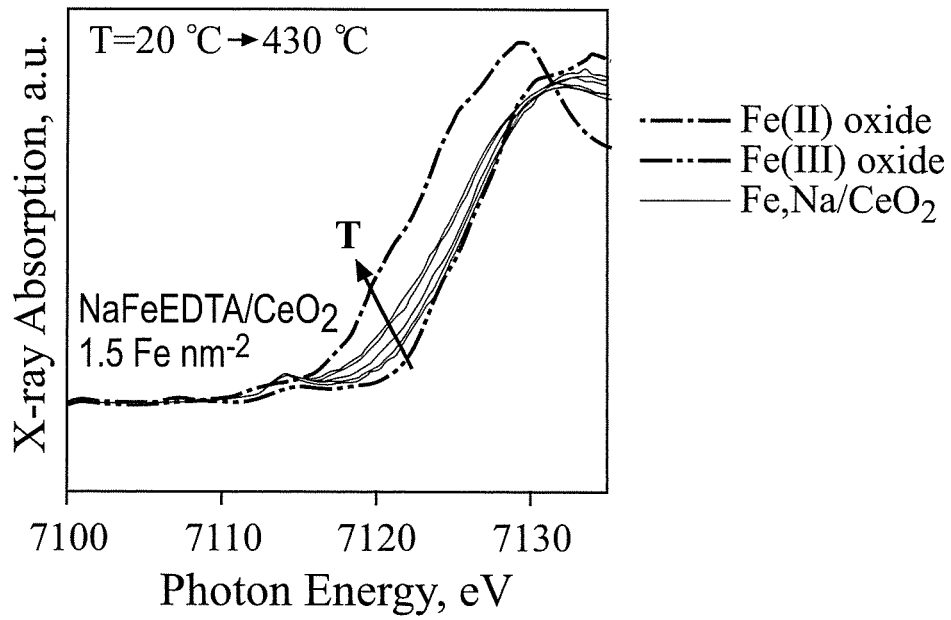
FIG. 10A is XANES spectra of two reference iron oxides and a catalyst fabricated using NaFeEDTA on $CeO_2$ loaded at 1.5 Fe.nm$^{-2}$ at varying temperature.
Figure 10B:
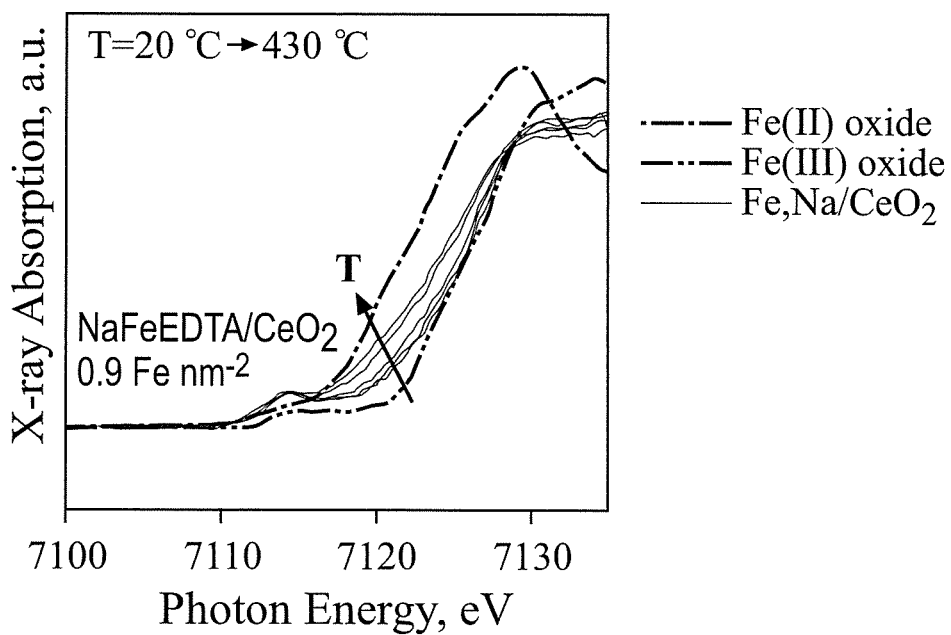
FIG. 10B is XANES spectra of two reference iron oxides and a catalyst fabricated using NaFeEDTA on $CeO_2$ loaded at 0.9 Fe.nm$^{-2}$ at varying temperature.
Figure 10C:
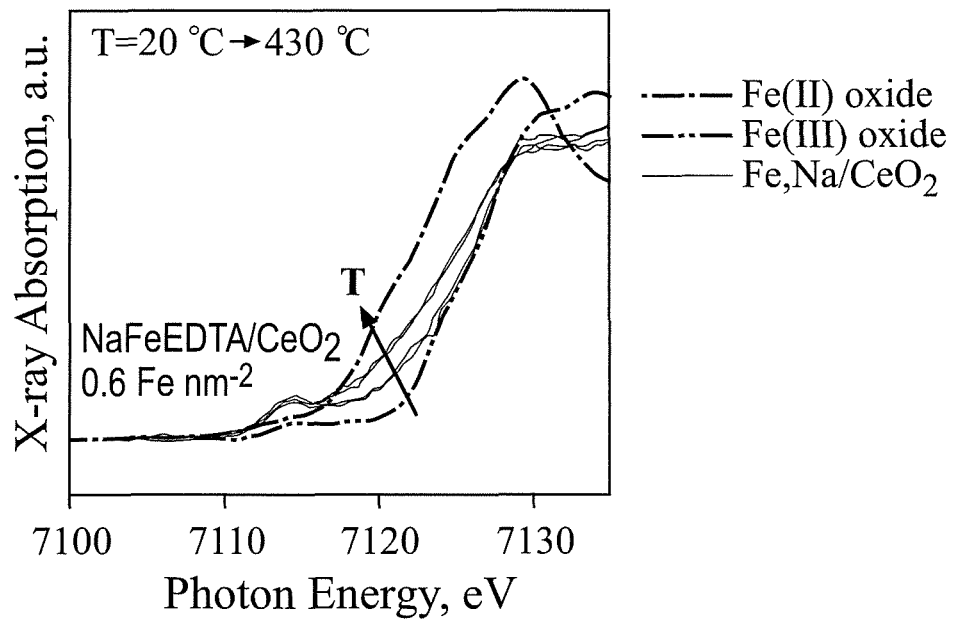
FIG. 10C is XANES spectra of two reference iron oxides and a catalyst fabricated using NaFeEDTA on $CeO_2$ loaded at 0.6 Fe.nm$^{-2}$ at varying temperature.
Figure 10D:
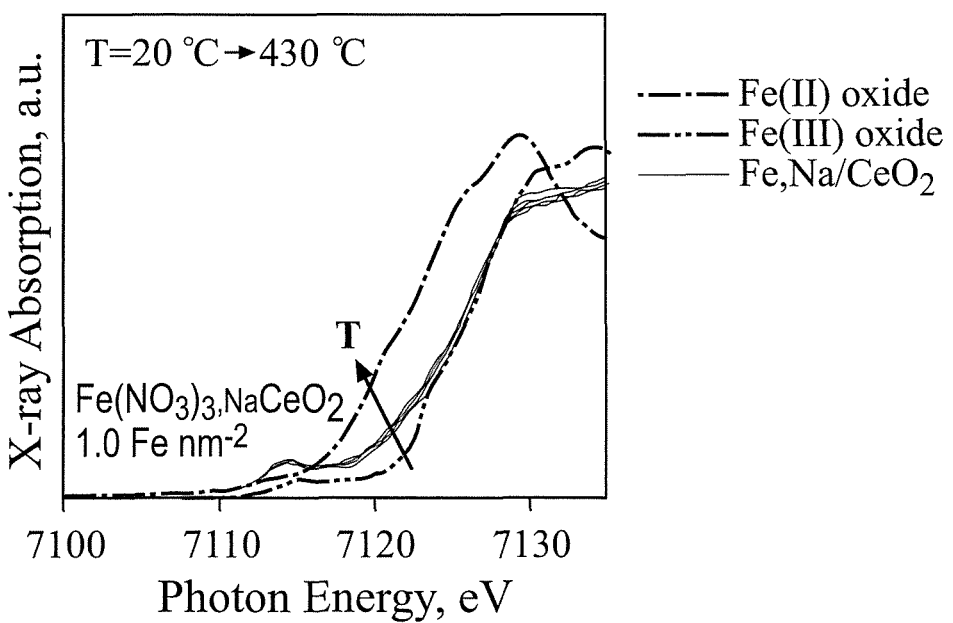
FIG. 10D is an XANES spectrum of two reference iron oxides and a catalyst fabricated using $Fe(NO_3)_3$ on $Na/CeO_2$ loaded at 1.0 Fe.nm$^{-2}$ at varying temperature.

Also observable in FIG. 8B, the 400/380° C. reduction event decreased by about 42% on the second TPR cycle for the catalyst fabricated according to Example 12. FIGS. 9A, 9B illustrate the fractional loss of catalytic cations capable of undergoing a second reduction in catalysts fabricated using protected catalytic cations at high loading densities. Note that the catalysts of FIG. 9B, fabricated using protected catalytic cations at low-to-moderate loading density according to Examples 7, 10, and 11 possess a catalytic cation fraction of about 45% which is capable undergoing multiple oxidation/reduction cycles under conditions where reduction temperatures do not exceed 550° C.

Examples 45-49

X-Ray Spectroscopy

X-ray Absorption Spectroscopy experiments were performed on catalysts fabricated according to Examples 4, 9, 10, and 12 in order to evaluate oxidation state as a function of temperature and surface geometry of catalytic cations at varying loading densities and for unprotected or protected catalytic cations.

X-ray absorption near edge structure (XANES) spectroscopy experiments were carried out on the Dupont-Northwestern Collaborative Access Team (DND-CAT) bending magnet D Beamline at Sector 5 of the Advanced Photon Source, Argonne National Laboratory. Incident and transmitted intensity were measured with Canberra ionization chambers. Beam energies were calibrated against Fe metal foil measured in transmittance and its K-edge was set to 7112 eV. FeO and $Fe_2O_3$ standards were brushed on Kapton tape and their spectra were measured also in transmittance.

Supported Fe materials were pressed into 50 mg pellets 2.5 cm in diameter. Single pellets were mounted on a stainless steel heated cell designed for transversal gas flow and sealed with a Be back window and Kapton front window. The void between the two windows was filled with quartz wool before placing the pellet to ensure it remained against the front Kapton sheet during experiments. Due to the low Fe content of the pellets, spectra were measured as fluorescence intensity using a four-channel SII Vortex-ME4 detector. Samples were mounted at incident angle $\theta=45\times$ with respect to the beam and detector, which were perpendicular to one another. Before starting the temperature program, spectra of the pellets loaded in the sample holder were compared to those of the corresponding powder materials brushed on Kapton tape and measure also as fluorescence intensity.

Following this, transversal flow of 50 sccm 3.5% $H_2$ and balance He started. The heated flow cell was held at ambient temperature, 150° C., 250° C., 340° C., and 430° C. for two hours each while spectra were collected. Temperatures are measured values inside the cell. Between holds, the temperature was ramped at ~10° $C.\cdot min^{-1}$.

FIG. 10 shows representative XANES spectra of four different catalysts, each analyzed across a temperature range of 20-430° C. Black dashed lines show reference spectra of ferrous and ferric oxide. All materials tested showed pre-edge features more intense of the bulk oxides, characteristic of undercoordinated iron species. The pre-edge features diminished in intensity for the catalysts fabricated using protected catalytic cations, suggesting decreased catalytic cation dispersion on substrate surfaces. The pre-edge feature is also more intense for the catalyst fabricated using unprotected catalytic cations (FIG. 10D) as compared to the catalyst fabricated using protected catalytic cation at a similar loading density (FIG. 10B).

Figure 11:
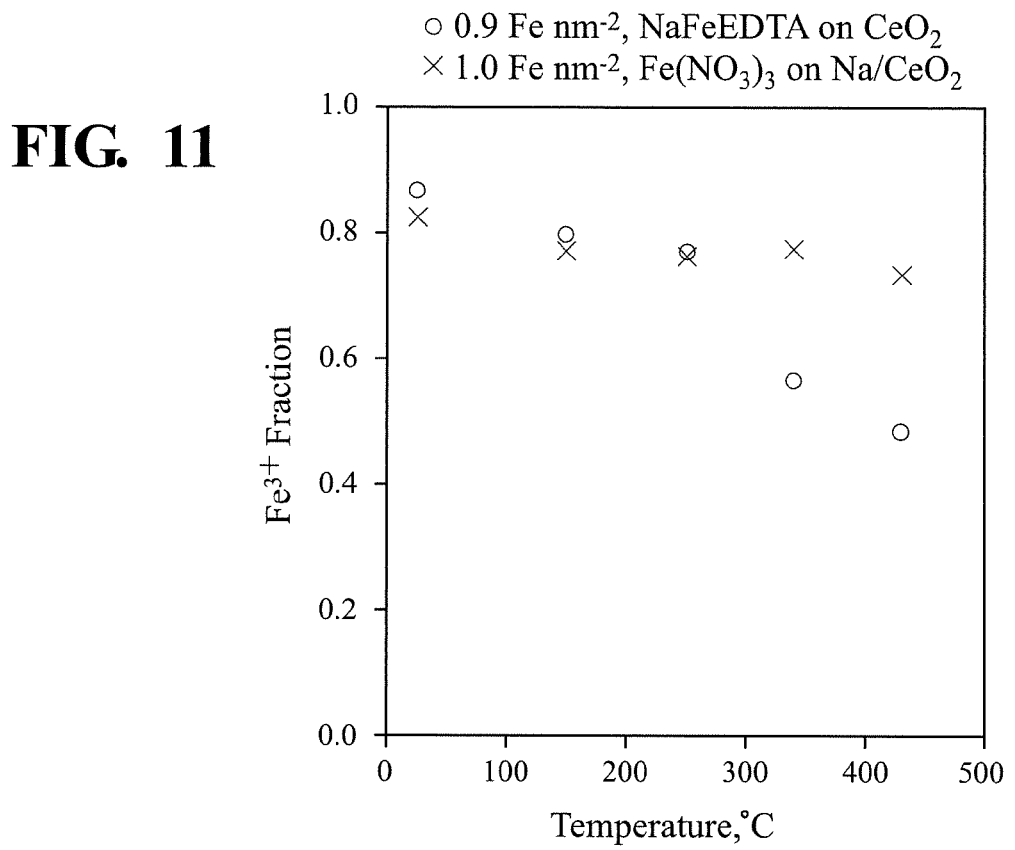
FIG. 11 is plot of catalytic cation oxidation state as a function of temperature and as measured by XANES for two types of catalyst.

FIG. 11 shows the fraction of Fe species existing as ferric or ferrous cation at various temperatures for a catalyst fabricated using unprotected catalytic cations and for a catalyst fabricated using protected catalytic cations. The fraction of Fe species existing as ferric or ferrous cation under each condition was determined by linear interpolation of the spectra in FIG. 10 between the ferrous and ferric oxide reference spectra. The results are in nearly exact agreement with fractional reduction determined by TPR. In particular, the results show a greater fraction of reducible ferric species in the catalyst fabricated using protected catalytic cations.

Examples 50-55

Catalytic Reduction of NO by $H_2$

Kinetic measurements of nitric oxide reduction reactions, with hydrogen gas as reducing agent and in the presence of catalysts fabricated according to Examples 4-30 were made in order to evaluate the catalytic efficiency of catalysts as a function of catalytic cation identity, catalytic cation protected or unprotected nature, and promoter cation identity and loading density. NO reduction by $H_2$ was carried out at atmospheric pressure in a quartz U-tube reactor (OD ¼", ID ⅛") charged with 25 mg of catalyst diluted in 0.50 g of non-porous quartz sand previously calcined to 600° C. and packed in down flow between beds of quartz wool. The U-tube reactor was lowered into an upright tube furnace (ID 2.5") and a thermocouple set against the top of the catalyst bed was used to control and record bed temperature. The thermocouple and quartz diluent showed no catalytic activity in control experiments. The reactor inlet was connected to a gas manifold and the outlet to a Pfeiffer Thermostar mass spectrometer. The reactor was then fed 50 sccm 3.3% NO, 3.3% $H_2$ 3.3% Ar, 90% He, heated at 10° $C.\cdot min^{-1}$ to 150° C., 250° C., 350° C., 450° C., and 550° C. and held at each temperature for 1 h. Complete disappearance of signals corresponding to atmospheric $N_2$, $O_2$, $H_2O$, and $CO_2$ as well as surface $H_2O$ was observed within 20 minutes at 150° C.

Figure 12:
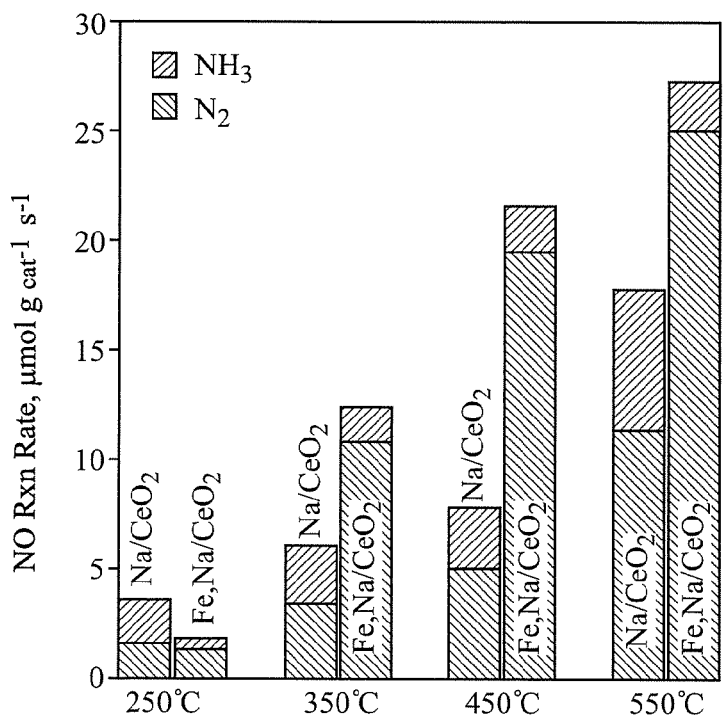
FIG. 12 is a bar graph of nitric oxide reduction rate as catalyzed by a catalyst or by a promoter cation-modified substrate at various temperatures.

FIG. 12 shows the quantities of $NH_3$ and $N_2$ product produced by a catalyst fabricated using protected catalytic cations and by a catalyst fabricated using unprotected catalytic cations. A reaction temperature of 450° C. showed high specificity for $N_2$ production and showed large differences between catalysts fabricated using protected catalytic cations as compared to catalysts fabricated using unprotected cations, and was thus used for future catalytic reduction experiments.

Figure 13A:
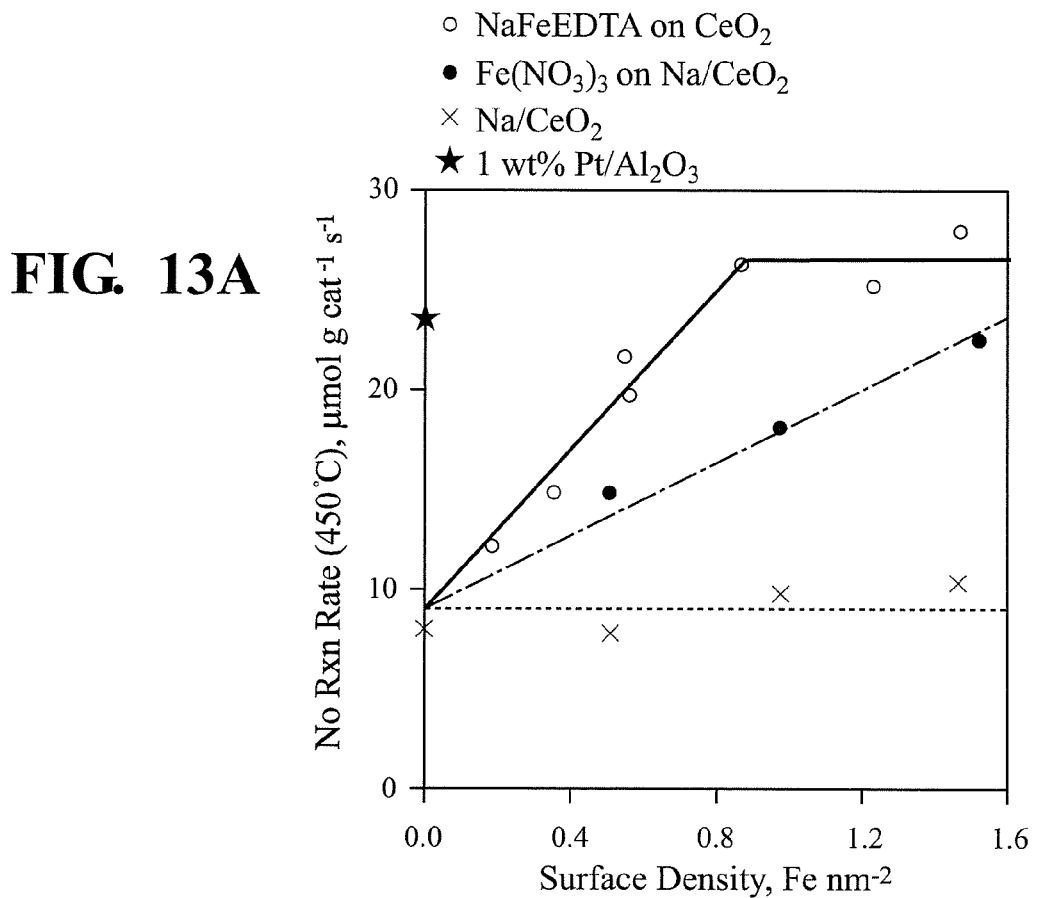
FIG. 13A is a plot of nitric oxide reduction rate as a function of loading density for two types of catalyst and for promoter cation-modified substrate with a Pd-catalyst as reference.

FIG. 13A shows the reaction rates of NO reduction for catalysts fabricated according to examples 4-13. Also examined were substrates loaded with 0, 0.25, 0.5, or 0.75 sodium promoter cations per $nm^2$, but no catalytic cations. The results agree with the TPR experiments, showing that catalysts fabricated with protected catalytic cations generally catalyze NO reduction at a greater rate than do comparable catalysts fabricated with unprotected catalytic cations. In addition, an activity plateau at the highest loading densities for the catalyst fabricated with protected catalytic cations agrees with the TPR results. Substrates loaded with promoter cations but no catalytic cations all had the same activity as did neat ceria, indicating there is no promoter effect in the absence of catalytic cations. A star symbol on the y-axis of FIG. 13A shows the corresponding reaction rate as catalyzed by a reference catalyst consisting of 1% by weight platinum (Pt) on alumina.

Figure 13B:
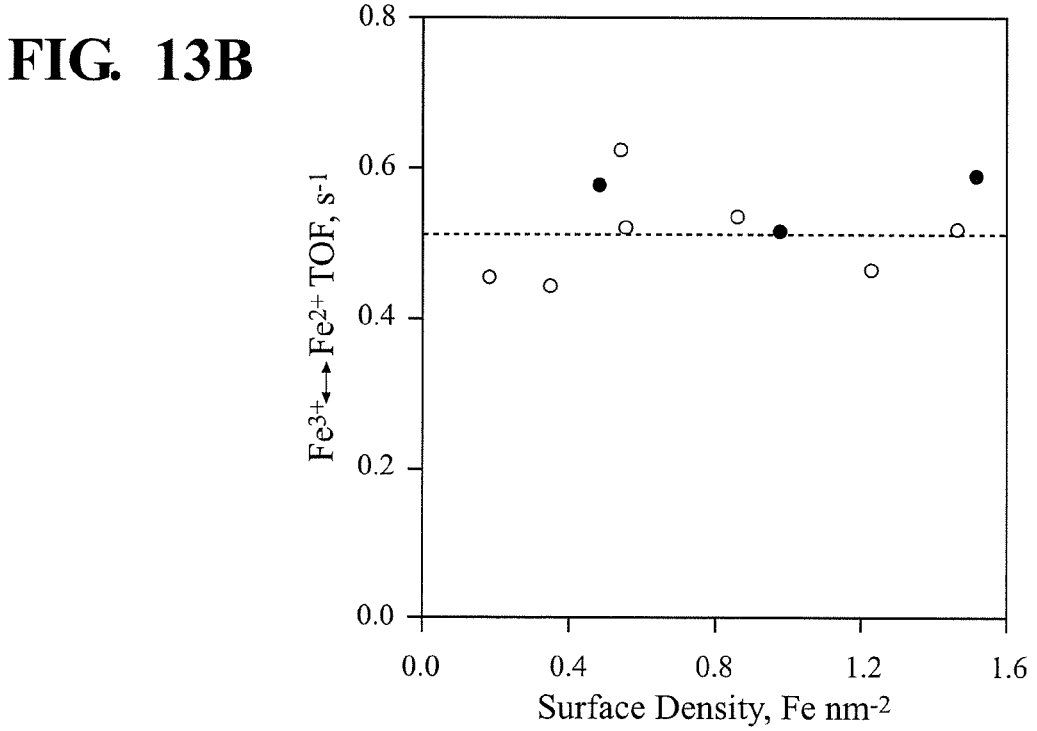
FIG. 13B is a plot of nitric oxide reduction turnover frequency as a function of loading density for two types of catalyst.

In FIG. 13B, turnover frequency is calculated based on the fraction of ferric species capable of reduction, determined by TPR. The turnover frequency of catalytic cites in a platinum based catalyst is represented by a star. The results show that turnover frequency is stable across loading densities, and is comparable to that of a platinum based catalyst.

Figure 14:
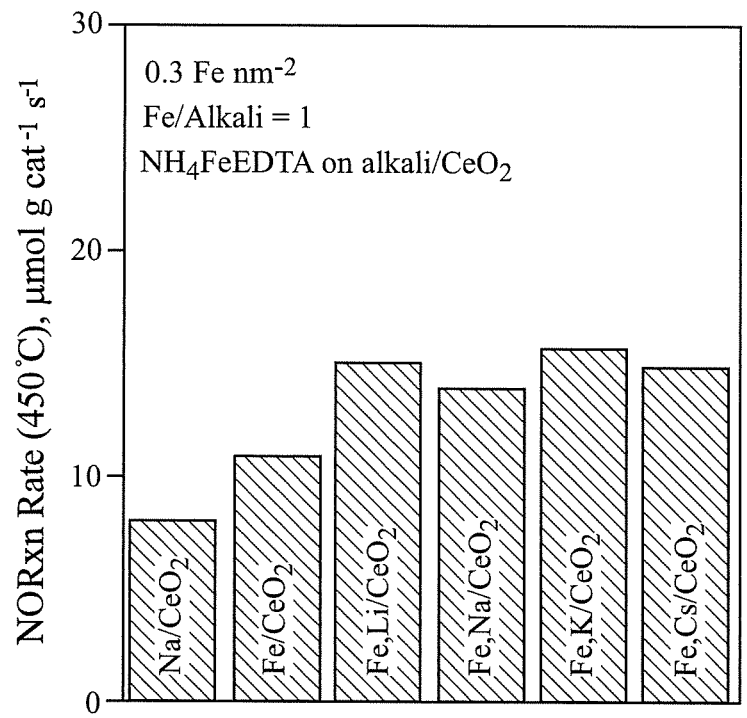
FIG. 14 is a plot of nitric oxide reduction reaction rate for catalysts fabricated using $NH_4FeEDTA$ on $CeO_2$ with various alkali metal promoter cations.

FIG. 14 shows reaction rate for various catalysts fabricated using protected catalytic cations, wherein several alkali metals are employed as promoter cations. The results indicate that the alkali metals employed are comparably effective as promoter cations. All of the alkali promoter cations increase the reaction rate by about 30% when used in 1:1 proportion to the protected catalytic cation, relative to the catalyst fabricated using protected catalytic cations without the optional promoter cations. This similarity suggests that the effect of promoter cations is most likely not electronic, but may be steric. Without being bound by any particular theory, one possible explanation for the uniform effect of various promoter cations is that the promoter cations occupy isolated sites on substrate surfaces, effectively blocking such isolated sites and inhibiting unproductive occupancy by catalytic cations. In such a model, catalytic cations would then tend to coalesce on substrate surfaces into two-dimensional sheets or, at high loading densities, three-dimensional crystallites.

Figure 15:
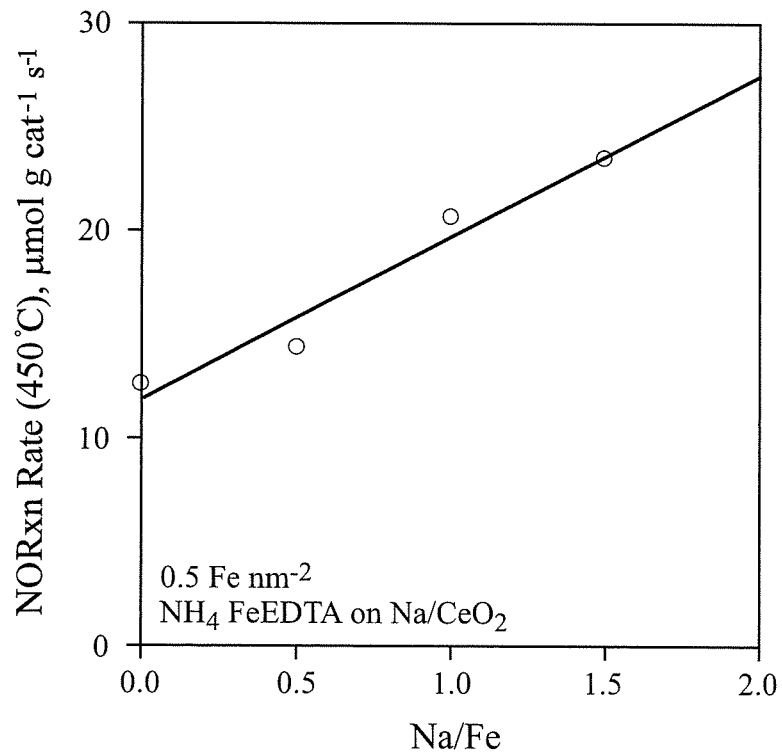
FIG. 15 is a plot of nitric oxide reduction rate for a catalyst fabricated using $NH_4FeEDTA$ on $CeO_2$ with various stoichiometric ratios of sodium promoter cations to catalytic cations.

FIG. 15 shows reaction rates as catalyzed by catalysts fabricated according to Examples 14, 19-21. These catalysts were fabricated using protected, ferric catalytic cations loaded at ~0.5 Fe.nm$^{-2}$, with sodium promoter cation loading densities varying from 0 to ~0.75 Na.nm$^{-2}$. The results indicate a linear dependence of reaction rate on promoter cation loading density over the examined density range.

Figure 16:
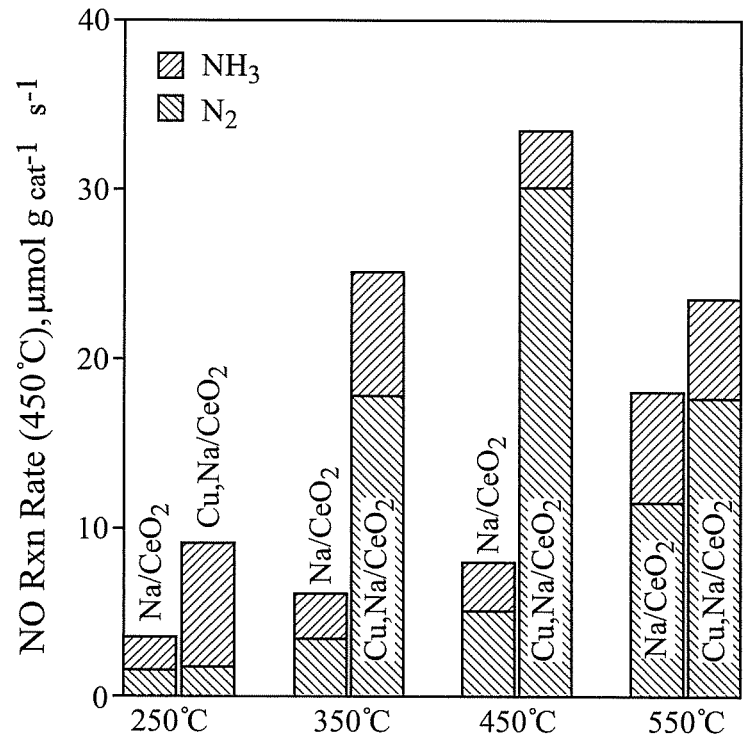
FIG. 16 is a bar graph of nitric oxide reduction rates for various catalysts fabricated using protected cupric catalytic cations.
Figure 17:
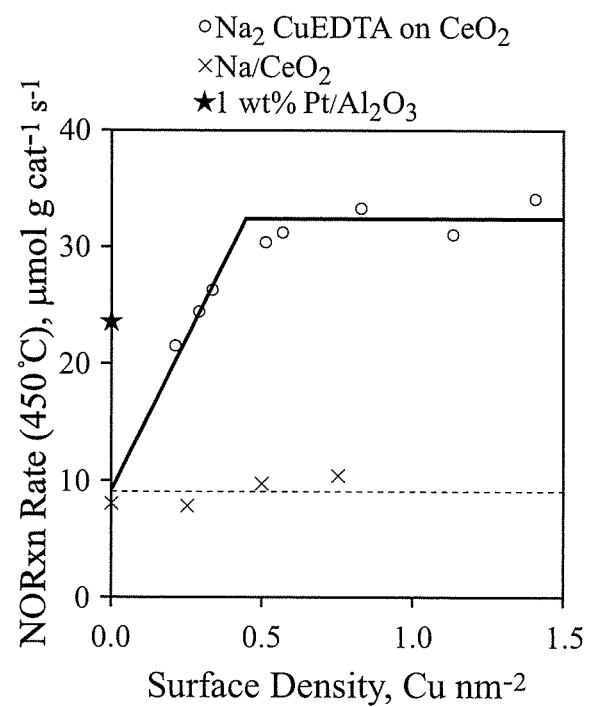
FIG. 17 is a plot of nitric oxide reduction rates for various catalysts fabricated using protected cupric catalytic cations as a function of catalytic cation loading density.

In FIG. 16, reaction rates for a set of similar catalysts are shown. The catalysts of FIG. 16 were fabricated using protected, cupric catalytic cations. As can be seen from comparison of FIG. 16 to FIG. 12, the catalysts fabricated using protected, cupric catalytic cations are somewhat superior to the catalysts fabricated using protected, ferric catalytic cations. Without wishing to be bound by any theory, this may be due to intrinsically better performance of cupric cations or the use of higher amounts of the promoter cations due to the precursor used. As seen in FIG. 17, the catalyst fabricated using protected, cupric catalytic cations also show a rate plateau at high loading densities, although the plateau occurs at lower densities compared to similar catalysts fabricated using protected, ferric catalytic cations (compare FIG. 17 to FIG. 13A).

Examples 56-58

Comparison to Cobalt

Figure 18:
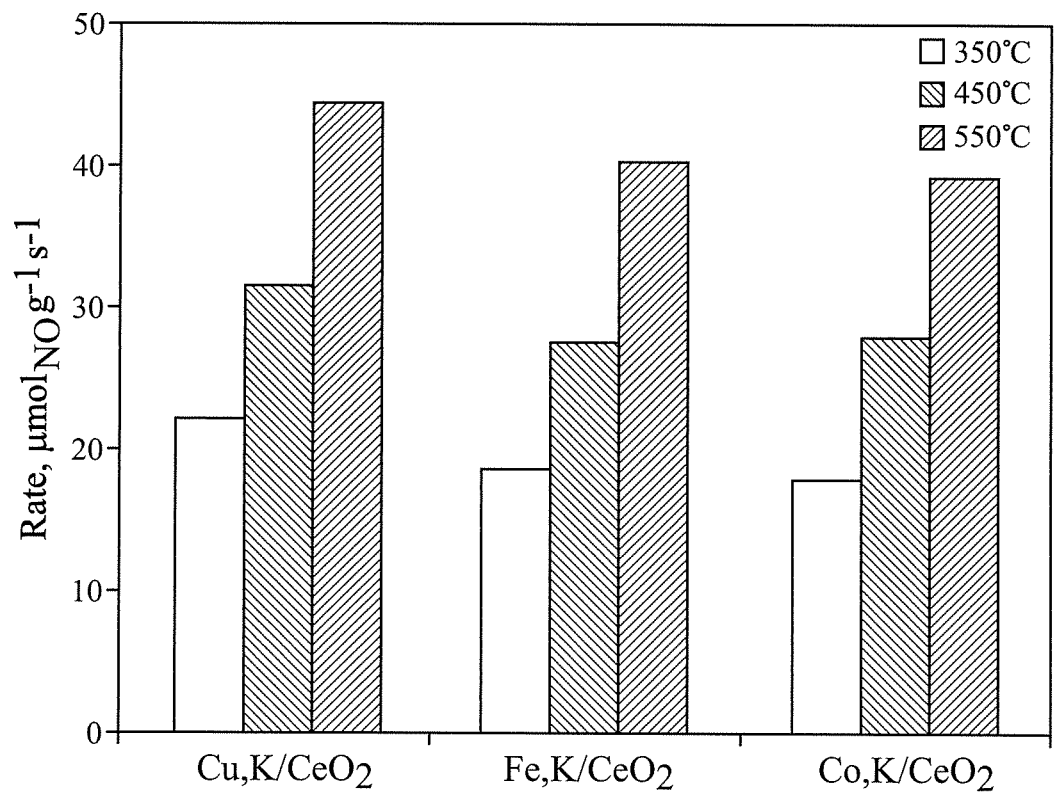
FIG. 18 is a bar graph of nitric oxide reduction rates at varying temperature for three different catalysts fabricated with iron, copper, or cobalt catalytic cations.

The results of NO reduction reaction rate measurements for the three catalysts at three temperatures are shown in FIG. 18. As shown in FIG. 18, the catalyst fabricated using protected catalytic cations which are cobaltic catalyzed the reaction with a rate similar to those of the catalysts fabricated using protected catalytic cations which are ferric or cupric.

Examples 59-63

Carbon Monoxide and Propylene as Reducing Agents

Activity of NO reduction with carbon monoxide as reducing agent was measured for catalysts prepared essentially according to Examples 10, 11, and 13 but with minor loading density differences (0.54, 0.89, and 1.32 wt %, respectively) and for unmodified $CeO_2$ substrate. Reaction and monitoring conditions were similar to those of Examples 50-55 but under a gas flow of 1000 ppm NO, 1000 ppm CO, balance He and at a flow rate of 100 sccm. GHSV (gas hourly space velocity) was held constant at ~30,000 h$^{-1}$. Reactions were heated to 250° C., 350° C., 450° C., and 550° C. and held at each temperature for ~1 h. A similar reaction was run using a catalyst prepared according to Example 13 with 1200 ppm NO, 133 ppm $C_3H_6$, balance He. The results of the carbon monoxide and propylene experiments are listed in Table 2.

| Example | 250° C. | 350° C. | 450° C. | 550° C. |
|---|---|---|---|---|
| NO Reduction in CO Activity ($\mu mol \cdot g_{cat}^{-1} \cdot s^{-1}$) | | | | |
| 10 | 0.45 | 1.77 | 3.13 | 5.32 |
| 11 | 0.52 | 1.99 | 3.41 | 5.38 |
| 13 | 0.58 | 2.40 | 4.14 | 6.86 |
| substrate | 0.03 | 0.43 | 0.99 | 2.79 |
| NO Reduction in $C_3H_6$ Activity ($\mu mol \cdot g_{cat}^{-1} \cdot s^{-1}$) | | | | |
| 13 | 0.00 | 0.00 | 0.81 | 3.09 |

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for fabricating a catalyst comprising:
    contacting a substrate containing ceria with a solution containing catalytic cations; and
    contacting the substrate with a solution containing promoter cations; wherein the catalytic cations consist of transition metal cations, post-transition metal cations, or a combination thereof, and the promoter cations consist of alkali metal cations, alkaline earth metal cations, or a combination thereof.

2. The method of claim 1 wherein the catalytic cations consist of Period 4 transition metal cations.

3. The method of claim 1 wherein the catalytic cations consist of iron, copper, cobalt, or a combination of cations thereof.

4. The method of claim 1 wherein contacting a substrate with a solution containing catalytic cations is repeated at least one time.

5. The method of claim 1 wherein the promoter cations consist of alkali metal cations.

6. The method of claim 1 wherein the solution containing catalytic cations comprises at least one chelator.

7. The method of claim 6 wherein the at least one chelator forms a chelation complex with catalytic cation having a net negative charge.

8. The method of claim 6 wherein the at least one chelator comprises EDTA.

9. A catalyst comprising:
    a substrate that includes ceria;
    catalytic cations bound to substrate surfaces; and
    promoter cations bound to substrate surfaces;
    wherein the catalytic cations consist of transition metal cations, post-transition metal cations, or a combination thereof, and the promoter cations consist of alkali metal cations, alkaline earth metal cations, or a combination thereof.

10. The catalyst of claim 9 wherein the catalytic cations consist of Period 4 transition metal cations.

11. The catalyst of claim 10 wherein the catalytic cations consist of iron, copper, cobalt, or a combination of cations thereof.

12. The catalyst of claim 9 wherein at least 30% of catalytic cations are able to undergo two or more reduction/oxidation cycles at reduction temperatures not to exceed 550° C.

13. The catalyst of claim 9 which catalyzes reduction of nitric oxide.

14. The catalyst of claim 9 which catalyzes the reduction of nitric oxide by carbon monoxide or propylene.

15. The catalyst of claim 9 which catalyzes the reduction of nitric oxide by hydrogen gas.

16. The catalyst of claim 9 having $N_2$ selectivity of greater than about 67%.

17. The catalyst of claim 9 having $N_2$ selectivity greater than about 90%.

18. The catalyst of claim 9 wherein the catalytic cations have a loading density of about 0.1-1.5% by weight, the promoter cations consist essentially of alkali metal cations, and the promoter cations are present in stoichiometric ratio to the catalytic cations which falls within a range of about 1:2 to 6:1, inclusive.

* * * * *